US010057461B2

(12) United States Patent
Shimazaki

(10) Patent No.: US 10,057,461 B2
(45) Date of Patent: Aug. 21, 2018

(54) AUTHENTICATION SYSTEM, IMAGE FORMING APPARATUS, TERMINAL APPARATUS, AND AUTHENTICATION METHOD

(71) Applicant: Takeshi Shimazaki, Kanagawa (JP)

(72) Inventor: Takeshi Shimazaki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 2 days.

(21) Appl. No.: 15/176,322

(22) Filed: Jun. 8, 2016

(65) Prior Publication Data
US 2016/0381251 A1 Dec. 29, 2016

(30) Foreign Application Priority Data

Jun. 25, 2015 (JP) ................. 2015-127331

(51) Int. Cl.
H04N 1/44 (2006.01)
H04N 1/00 (2006.01)
(52) U.S. Cl.
CPC ....... H04N 1/4426 (2013.01); H04N 1/00204 (2013.01); H04N 1/00244 (2013.01); H04N 1/00334 (2013.01); H04N 2201/0094 (2013.01)
(58) Field of Classification Search
CPC ............. H04N 1/4426; H04N 1/00204; H04N 1/00244; H04N 1/00334; H04N 2201/0094
See application file for complete search history.

(56) References Cited

U.S. PATENT DOCUMENTS

2015/0124281 A1* 5/2015 Watanabe .......... H04N 1/32122
358/1.14
2015/0264569 A1* 9/2015 Toyota .................. H04W 12/06
726/7
2017/0025121 A1* 1/2017 Tang ....................... G10L 15/20

FOREIGN PATENT DOCUMENTS

JP 2010-218186 9/2010
JP 2013-225720 10/2013
JP 2014-202031 10/2014

* cited by examiner

Primary Examiner — Iriana Cruz
(74) Attorney, Agent, or Firm — Harness, Dickey & Pierce, P.L.C.

(57) ABSTRACT

An authentication system includes a terminal apparatus, and an information processing apparatus configured to acquire authentication information from the terminal apparatus. The terminal apparatus includes an operation determination part configured to determine whether values of one or more sensors included in the terminal apparatus fall within predetermined ranges, and a code display controller configured to display a code including authentication information on a screen of the terminal apparatus when the one or more values of the sensors fall within the predetermined ranges. The information processing apparatus includes an authentication processor configured to extract the authentication information from the code.

20 Claims, 15 Drawing Sheets

FIG.6

| USER'S OPERATION | VALUE RANGES OF SENSORS (REFERENCE INFORMATION) |
|---|---|
| OPERATION OF REVERSING TERMINAL | - GRAVITY SENSOR DETECTS GRAVITY OF −8 TO −10 m/s² IN Z AXIS OF TERMINAL OR 8 TO 10 m/s² IN Y AXIS OF TERMINAL<br>- GYROSCOPE DETECTS ANGULAR VELOCITY OF 3 TO 8 rad/s OR −3 TO −8 rad/s IN Y AXIS OF TERMINAL<br>- ANGULAR SENSOR DETECTS ANGLE (ROTATION) OF 120 TO 180° OR −120 TO −180° IN Y AXIS OF TERMINAL |
| OPERATION OF MOVING TERMINAL | - ACCELERATION SENSOR DETECTS ACCELERATION OF 10 TO 16 m/s² IN Y AXIS OR −9 TO −12 m/s² IN Z AXIS OF TERMINAL |
| OPERATION OF MOVING TERMINAL SCREEN CLOSE TO READER | - PROXIMITY SENSOR DETECTS OBJECT AT POSITION WITHIN 5 cm FROM SCREEN FOR 0.5 SEC. OR MORE |

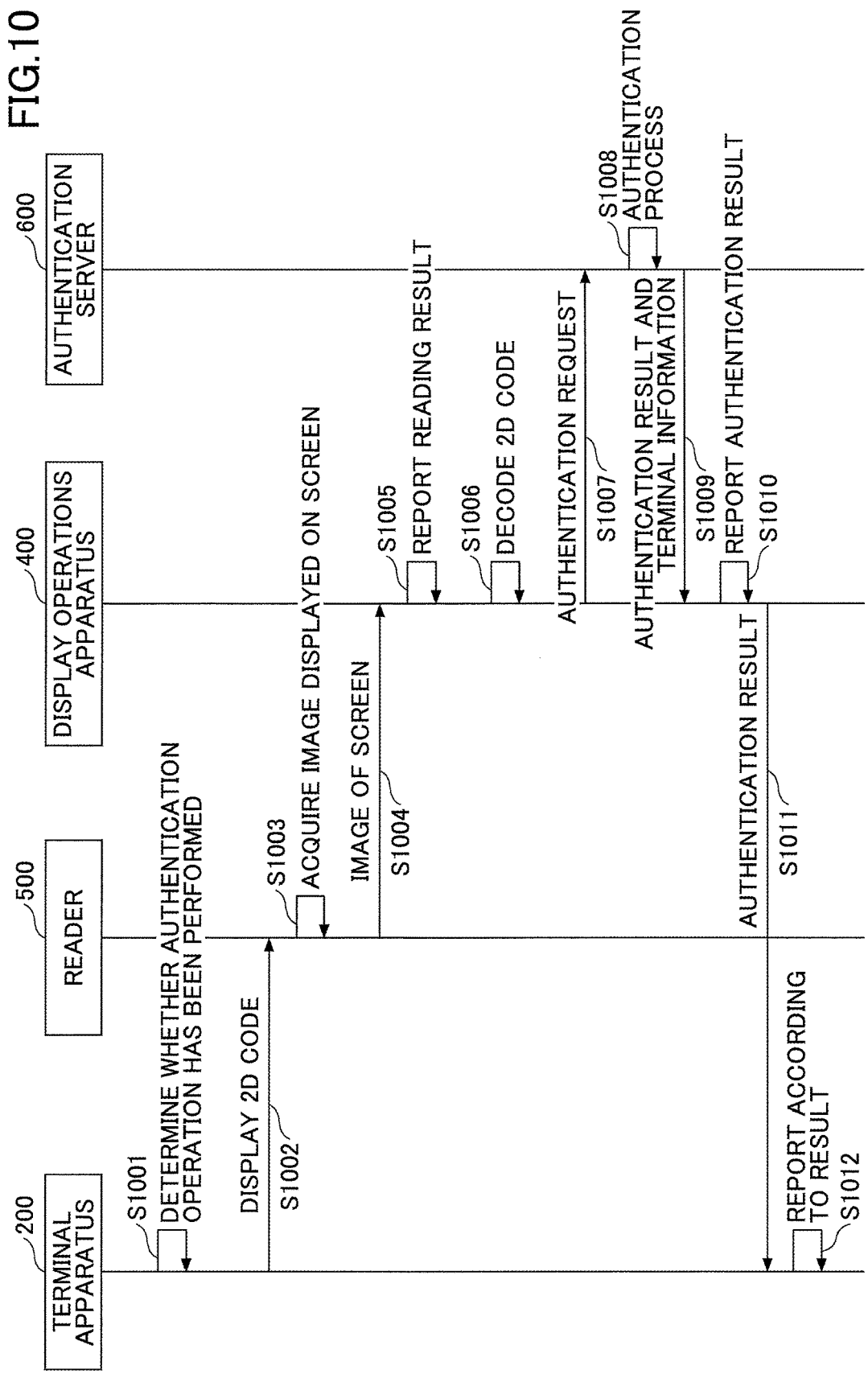

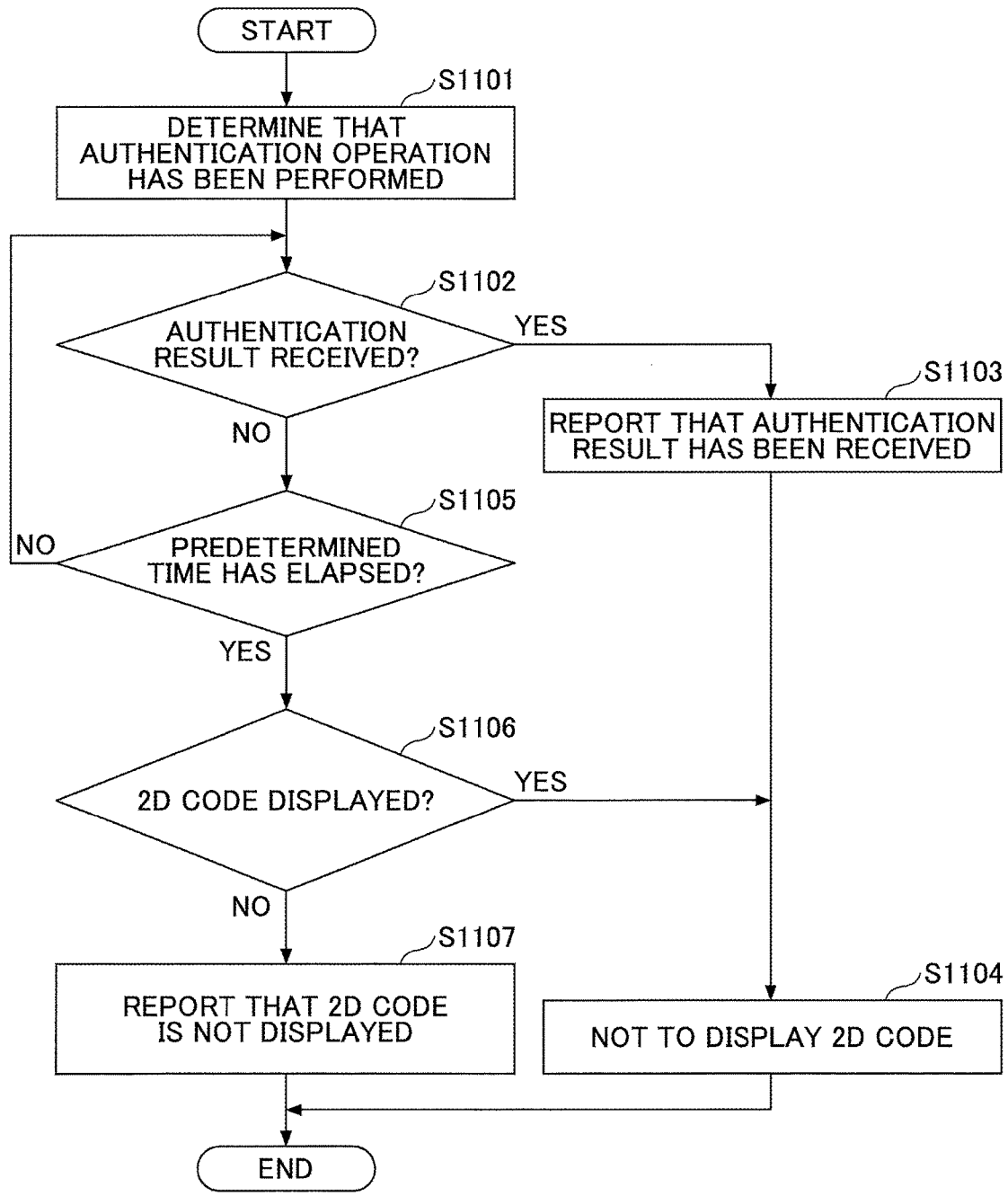

AUTHENTICATION SYSTEM, IMAGE FORMING APPARATUS, TERMINAL APPARATUS, AND AUTHENTICATION METHOD

BACKGROUND OF THE INVENTION

1. Field of the Invention

The disclosures discussed herein relate to an authentication system, an image forming apparatus, a terminal apparatus, and an authentication method.

2. Description of the Related Art

QR codes (registered trademark) are authentication information including IDs and passwords, which plays a central role in an authentication mechanism in a well-known related-art authentication technology. The authentication technology involves displaying the QR codes as the authentication information on smartphones or terminal apparatuses, and allowing an apparatus to scan the displayed QR codes.

An example of such a related-art authentication technology discloses a method of authenticating terminal apparatuses by allowing an image forming apparatus to scan QR codes displayed on the terminal apparatuses.

The above-described technology may, however, be susceptible to leakage of authentication information; for example, the terminal apparatuses that display the QR codes may be surreptitiously filmed or surreptitiously photographed before the QR codes are scanned by the apparatus.

RELATED ART DOCUMENT

Patent Document

Patent Document 1: Japanese Unexamined Patent Application Publication No. 2010-218186

SUMMARY OF THE INVENTION

Accordingly, it is an object in one embodiment of the present invention to provide a technology capable of controlling leakage of authentication information that substantially obviates one or more problems caused by the limitations and disadvantages of the related art.

According to an aspect of embodiments, there is provided an authentication system that includes a terminal apparatus, and an information processing apparatus configured to acquire authentication information from the terminal apparatus. The terminal apparatus includes an operation determination part configured to determine whether values of one or more sensors included in the terminal apparatus fall within predetermined ranges, and a code display controller configured to display a code including authentication information on a screen of the terminal apparatus when the one or more values of the sensors fall within the predetermined ranges. The information processing apparatus includes an authentication processor configured to extract the authentication information from the code.

Other objects, features and advantages of the present invention will become more apparent from the following detailed description when read in conjunction with the accompanying drawings.

BRIEF DESCRIPTION OF THE DRAWINGS

FIG. 6 is a diagram illustrating reference information;

FIG. 10 is a sequence diagram illustrating operations of an authentication system;

FIG. 11 is a flowchart illustrating operations after authentication operation being performed is determined in the terminal apparatus;

DETAILED DESCRIPTION OF THE PREFERRED EMBODIMENTS

Figure 1:
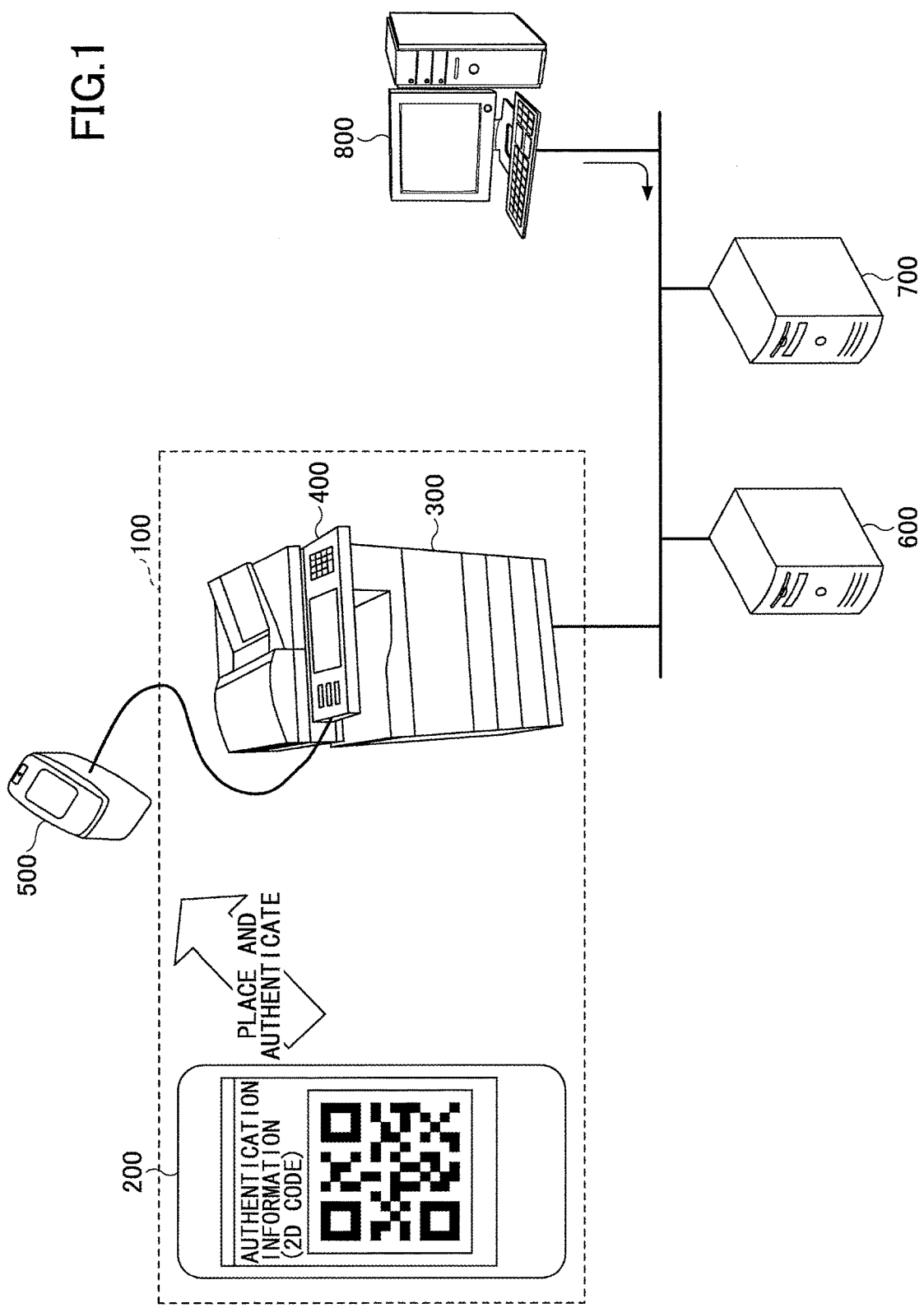
FIG. 1 is a diagram illustrating an example of an authentication system.

The following illustrates embodiments of the present invention with reference to the accompanying drawings. FIG. 1 is a diagram illustrating an example of an authentication system 100.

The authentication system 100 of an embodiment includes a terminal apparatus 200, and an information processing apparatus 300. In the authentication system 100, the terminal apparatus 200 displays a two-dimensional code representing authentication information, and the information processing apparatus 300 authenticates the terminal apparatus 200 based on the authenticate information represented by the two-dimensional code.

The terminal apparatus 200 may be a smartphone or a mobile phone. The terminal apparatus 200 may also be a tablet terminal computer. The terminal apparatus 200 may include a display function.

The information processing apparatus 300 may be an image forming apparatus having a print function and the like, and may include a display operations apparatus 400 configured to perform operations of the information processing apparatus 300. The display operations apparatus 400 may be connected to a reader 500 configured to acquire the two-dimensional code displayed on the terminal apparatus 200. The display operations apparatus 400 may be connected to the reader 500 via, for example, a universal serial bus or the like.

The information processing apparatus 300 acquires the two-dimensional code displayed on the terminal apparatus 200 via the reader 500 to acquire the authentication information represented by the two-dimensional code via the display operations apparatus 400. The information processing apparatus 300 subsequently authenticates the terminal apparatus 200 based on the acquired authentication information.

The terminal apparatus 200 that displays the two-dimensional code determines whether a user of the terminal apparatus 200 has held the terminal apparatus 200 (two-dimensional code) over the reader 500. When the terminal apparatus 200 has determined that a corresponding operation has been performed, the terminal apparatus 200 displays the two-dimensional code.

In this embodiment, the two-dimensional code is displayed on the terminal apparatus 200 by moving a screen of the terminal apparatus 200 close to the reader 500. That is, the terminal apparatus 200 will not display the two-dimensional code until the user, who has given an instruction to the terminal apparatus 200 to display the two-dimensional code, moves the terminal apparatus 200 close to the reader 500.

Further, when the user does not hold the terminal apparatus 200 over the reader 500; that is, when the terminal apparatus 200 is not placed or located close to the reader 500, the terminal apparatus 200 will not display the two-dimensional code.

Thus, the authentication system 100 will not allow a third party to see the screen of the terminal apparatus 200 displaying the two-dimensional code so as to control leakage of authentication information.

The authentication information may be a user ID and a password that specify the user of the terminal apparatus 200. Alternatively, the authentication information may be may be a phone number assigned to the terminal apparatus 200. Further, the authentication information may include information unique to the terminal apparatus 200 for identifying the terminal apparatus 200.

The two-dimensional code of the terminal apparatus 200 may be a QR code or the like that is generated from the authentication information. In the embodiment, the two-dimensional code is employed as a code generated from the authentication information; however, the code generated from the authentication information may be a one-dimensional code such as a barcode or the like.

The information processing apparatus 300 may be connected to an authentication server 600, a print server 700, and a computer 800 via a network.

The authentication server 600 receives authentication information from the information processing apparatus 300 to perform authentication. The information processing apparatus 300 may transmit the authentication information received from the terminal apparatus 200 to further allow the authentication server 600 to perform the authentication in addition to the authentication performed by the information processing apparatus 300 itself.

The print server 700 accumulates print jobs generated by the computer 800 or the like.

When the terminal apparatus 200 is authenticated based on the authentication information acquired from the terminal apparatus 200, the information processing apparatus 300 displays a list of the print jobs accumulated in the print server 700, and executes a selected one of the print job on the list.

Note that in this embodiment, the information processing apparatus 300 is illustrated as an image forming apparatus; however, the information processing apparatus 300 is not limited to the image forming apparatus. The information processing apparatus 300 may be any apparatus configured to perform authentication. Examples of the information processing apparatus 300 include image forming apparatuses (an MFP, a printer, a scanner, a facsimile machine, etc.), a storage server, and image display apparatuses (a projector, a TV, a display, an electronic whiteboard, etc.).

Figure 2:
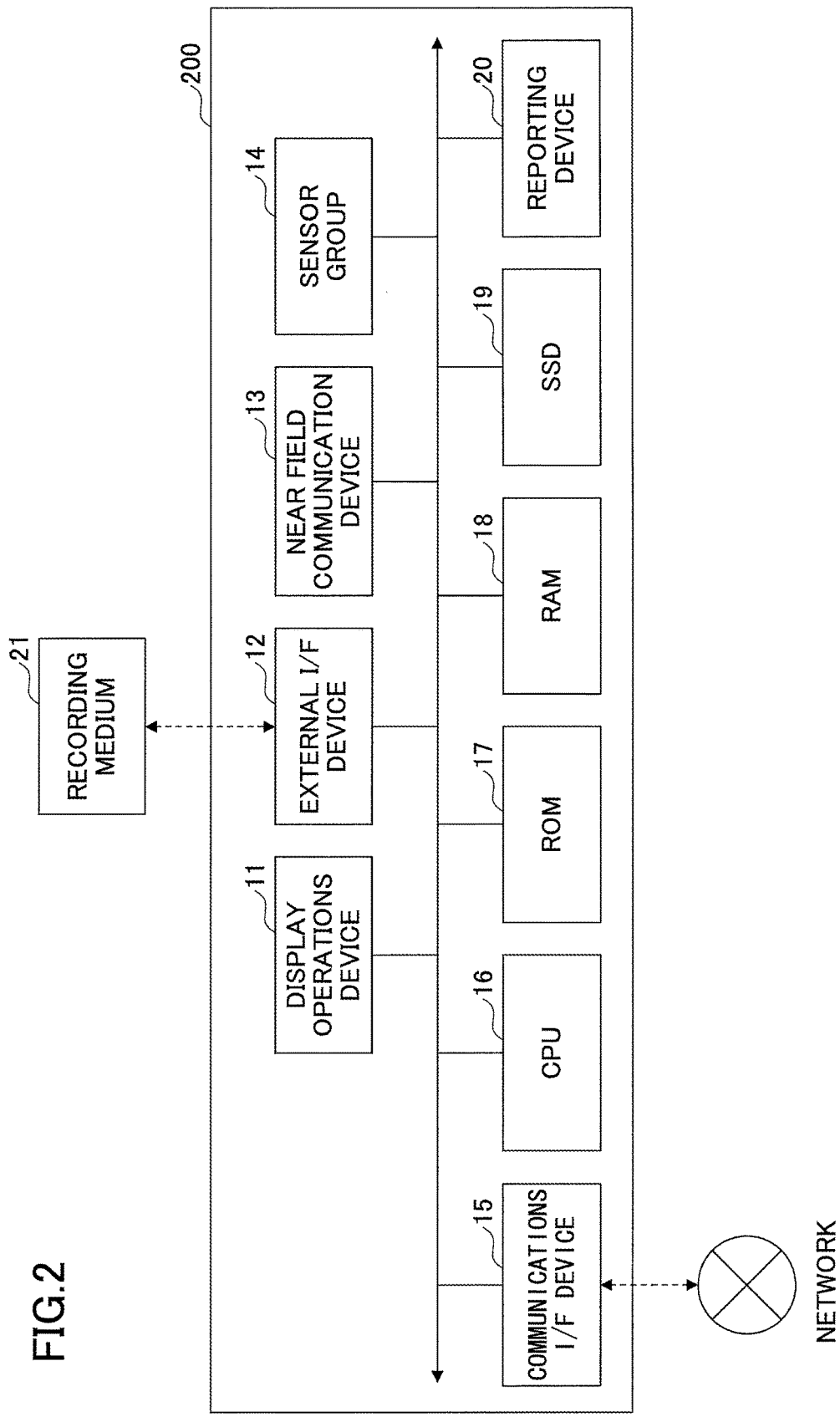
FIG. 2 is a diagram illustrating a hardware configuration of a terminal apparatus.

Next, a hardware configuration of the terminal apparatus 200 is illustrated with reference to FIG. 2. FIG. 2 is a diagram illustrating a hardware configuration of a terminal apparatus.

The terminal apparatus 200 includes a display operations device 11, an external interface (I/F) device 12, a near field communication device 13, a sensor group 14, a communications I/F device 15, a central processing unit (CPU) 16, a read only memory ROM 17, a random access memory (RAM) 18, a solid state drive (SSD) 19, and a reporting device 20 that are mutually connected via a bus. Note that the terminal apparatus 200 may include an imaging device.

The display operations device 11 may be a touch panel or the like configured to input or output information. Note that the terminal apparatus 200 may include an input device implemented by hardware keys or the like, and an output device implemented by a liquid crystal panel or the like, instead of the display operations device 11.

The external I/F device 12 serves as an interface with an external device such as a recording medium 21. The near field communication device 13 may be a near field communication chip or the like configured to perform near field communications.

The sensor group 14 includes various types of sensors included in the terminal apparatus 200. Examples of the sensor group 14 include a gravity sensor, a gyroscope, an angular sensor, an acceleration sensor, and a proximity sensor. The gravity sensor is configured to detect magnitudes applied in directions of an X axis, a Y axis, and a Z axis of the terminal apparatus 200. The gyroscope is configured to detect angular velocities around X axis, the Y axis, and the Z axis of the terminal apparatus 200. The angular sensor is configured to detect angles of rotation around the X axis, the Y axis, and the Z axis of the terminal apparatus 200. The acceleration sensor is configured to detect accelerations applied in the X axis, the Y axis, and the Z axis directions of the terminal apparatus 200. The proximity sensor is configured to detect whether an object is close to the display operations device 11, that is, within 5 cm from the display operations device 11. Note that the X axis, the Y axis, and the Z axis of the terminal apparatus 200 will be described later.

The sensor group 14 may further include an optical sensor configured to detect uprightness, a magnetic field sensor configured to detect orientation, a thermo-hydro sensor configured to detect the temperature and humidity, and a pressure sensor configured to detect atmospheric pressure.

The communications I/F 15 may serve as an interface for connecting the terminal apparatus 200 to mobile telephone networks, the Internet, or the like.

The CPU 16 is configured to implement control of the overall operations or functions of the terminal apparatus 200 by loading programs and data in the RAM 18 from a storage device such as the ROM 17 and the SSD 19 to execute processes in accordance with the loaded programs and data.

The RAM 18 is a volatile semiconductor memory configured to temporarily store programs and data. The ROM 17 is a nonvolatile semiconductor memory configured to retain programs or data even when the power supplied is turned off. The ROM 17 is configured to store BIOS that is executed at startup of the terminal apparatus 200, OS settings, network settings, and the like.

The SSD 19 serves as a non-volatile storage device configured to store programs and data. Examples of the programs and data stored in the SSD 19 include an operating system (OS) for controlling overall operations of the terminal apparatus 200, and application software for providing various functions on the OS. The SSD 19 is configured to manage the stored programs or data with a predetermined file system or a database (DB). Note that the terminal apparatus 200 may include a hard disk drive (HDD) instead of the SSD 19.

The reporting device 20 includes a vibrating device implemented by a vibrator or the like, a speaker, and a light, and is configured to report a predetermined status of the terminal apparatus 200 to a user. A code display program indicates a part of the program stored in a recording device such as the ROM 17, the RAM 18, or the SSD 19 included in the terminal apparatus 200.

The code display may be provided by being distributed in a form of a recording medium 21 or downloaded from the network. Note that various types of recording media may be used as the recording medium 21 storing the code display program, examples of which include a CR-ROM (compact disk read-only memory), a flexible disk, and a magneto-optical disk, or semiconductor memory or the like electrically recording information such as a ROM (read-only memory), a flash memory or the like.

When the recording medium 21 storing the code display program is set in the external I/F device 12, the code display program is installed from the recording medium 21 to the SSD 19 or the like via the external I/F device 12. The code display program downloaded from the network may be installed in the SSD 19 or the like via the external I/F device 12.

The CPU 16 is configured to implement later-described various types of processes in accordance with the installed code display program.

Figure 3:
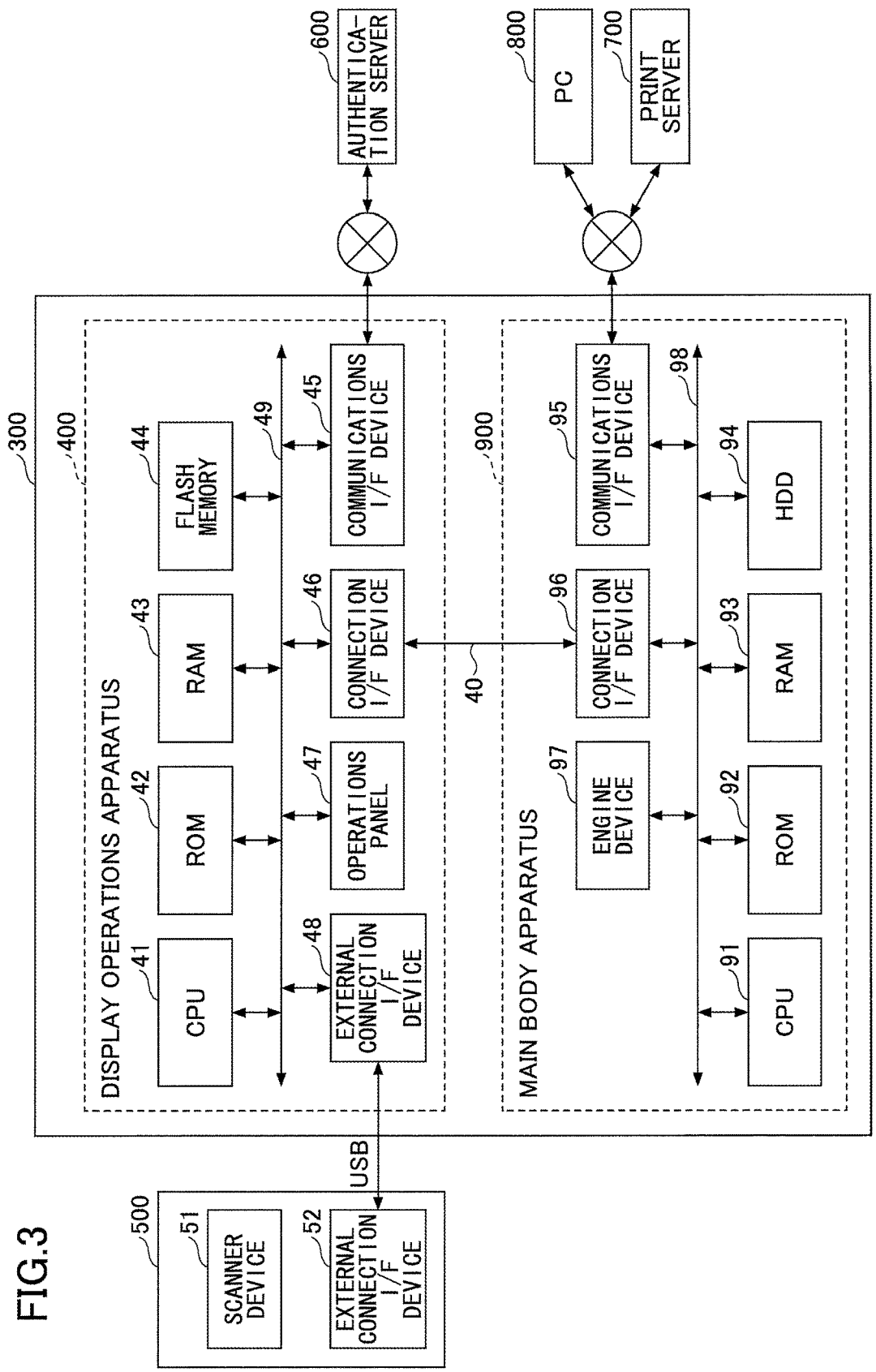
FIG. 3 is a diagram illustrating a hardware configuration of an information processing apparatus.

Next, a hardware configuration of the information processing apparatus 300 is illustrated with reference to FIG. 3. FIG. 3 is a diagram illustrating the hardware configuration of the information processing apparatus 300.

The information processing apparatus 300 includes a display operations apparatus 400, and a main body apparatus 900. The display operations apparatus 400 is configured to receive operational inputs from a user. Note that receiving the operation input by the user indicates a concept including receiving information (including signals or the like indicating coordinate values of the screen) input by the user's operational inputs.

The main body apparatus 900 is configured to implement various types of functions such as a copier function, a scanner function, a facsimile function, and printer function.

The main body 900 and the display operations apparatus 400 are inter-communicative coupled via a dedicated communications channel 40. The communications channel 40 may employ one of universal serial bus (USB) standards; however, the dedicated communications channel 40 may employ any standards regardless of wired or wireless standards.

Note that main body 900 may operate in accordance with the operational inputs received by the display operations apparatus 400. The main body 900 may be able to communicate with external apparatuses such as client personal computers (PCs), and may operate in accordance with instructions received from the external apparatuses. The following illustrates a hardware configuration the program providing system 90 first. The main body apparatus 900 includes a CPU 91, a ROM 92, a RAM 93, a HDD 94, a communications I/F device 95, a connection I/F device 96, and an engine device 97, which are mutually connected via a system bus 98.

The CPU 91 is configured to integrally control operations of the main body apparatus 900. The CPU 91 is configured to control overall operations of the main body apparatus 900 and implement the above-described various types of functions by executing a program stored in the ROM 92 or the HDD 94, using the RAM 93 as a work area.

The communications I/F device 95 serves as an interface for connecting the main body apparatus 900 to the network, and is configured to connect the main body apparatus 900 to the print server, the PC, and the like via the network.

The connection I/F part 96 serves as an interface configured to allow the main body apparatus 900 to perform communications with the display operations apparatus 400 via the dedicated communications channel 40.

The engine device 97 is hardware configured to allow the main body apparatus 900 to perform processing excluding routine information processing and communications to implement the copier function, the scanner function, the facsimile function, and the printer function. The engine device 97 may, for example, include a scanner (an image reader part) configured to scan images of a document, a plotter (an image forming part) configured to perform printing on a recording medium such as a sheet of paper, and a facsimile part configured to perform facsimile communications. The engine device 97 may further include specific options such as a finisher configured to sort the printed recording media or an auto document feeder (ADF) configured to automatically feed documents.

Next, a description is given of a hardware configuration of the display operations apparatus 400. The display operations apparatus 400 includes a CPU 41, a ROM 42, a RAM 43, a flash memory 44, a communications I/F device 45, a connection I/F device 46, an operations panel 47, and an external connection I/F device 48, which are mutually connected via a system bus 49.

The CPU 41 is configured to integrally control operations of the display operations apparatus 400. The CPU 41 is configured to control overall operations of the display operations apparatus 400, and implement the later-described various types of functions by executing a program stored in the ROM 42 or the flash memory 44, using the RAM 43 as a work area.

The communications I/F device 45 serves an interface for connecting the display operations apparatus 400 to the network, and is configured to connect the display operations apparatus 400 to an authentication server and the like via the network.

The connection I/F part 46 serves as an interface configured to allow the display operations apparatus 400 to perform communications with the main body apparatus 900 via the dedicated communications channel 40. The external connection I/F device 48 is an interface (e.g., USB) for connecting the display operations apparatus 400 to the reader 500.

The operations panel 47 is configured to receive various types of inputs in accordance with operations of the user, and display various types of information. The various types of information include information in accordance with received operational inputs, information indicating an operating status of an MFP 100, information indicating setting statuses, and the like.

The operations panel 47 may be implemented by a liquid crystal display (LCD) apparatus with a touch panel function installed, an organic electro luminescence (EL) display apparatus with a touch panel function installed. The operations panel 47 may further or alternatively include an operation part such as hardware keys or a display part such as a lamp. Note that the operations panel 47 corresponds to the display part.

Next, a description is given of a hardware configuration of the reader 500 connected to the display operations apparatus 400. The reader 500 serves as hardware for reading a two-dimensional code. Specifically, the reader 500 is configured to read or shoot an image. Examples of the reader 500 include a QR code reader, a barcode reader, and a camera.

The reader 500 includes a scanner device 51 configured to read or shoot an image, and an external I/F device 52 configured to transmit the image to the information processing apparatus 300 (the display operations apparatus 400).

Figure 4:
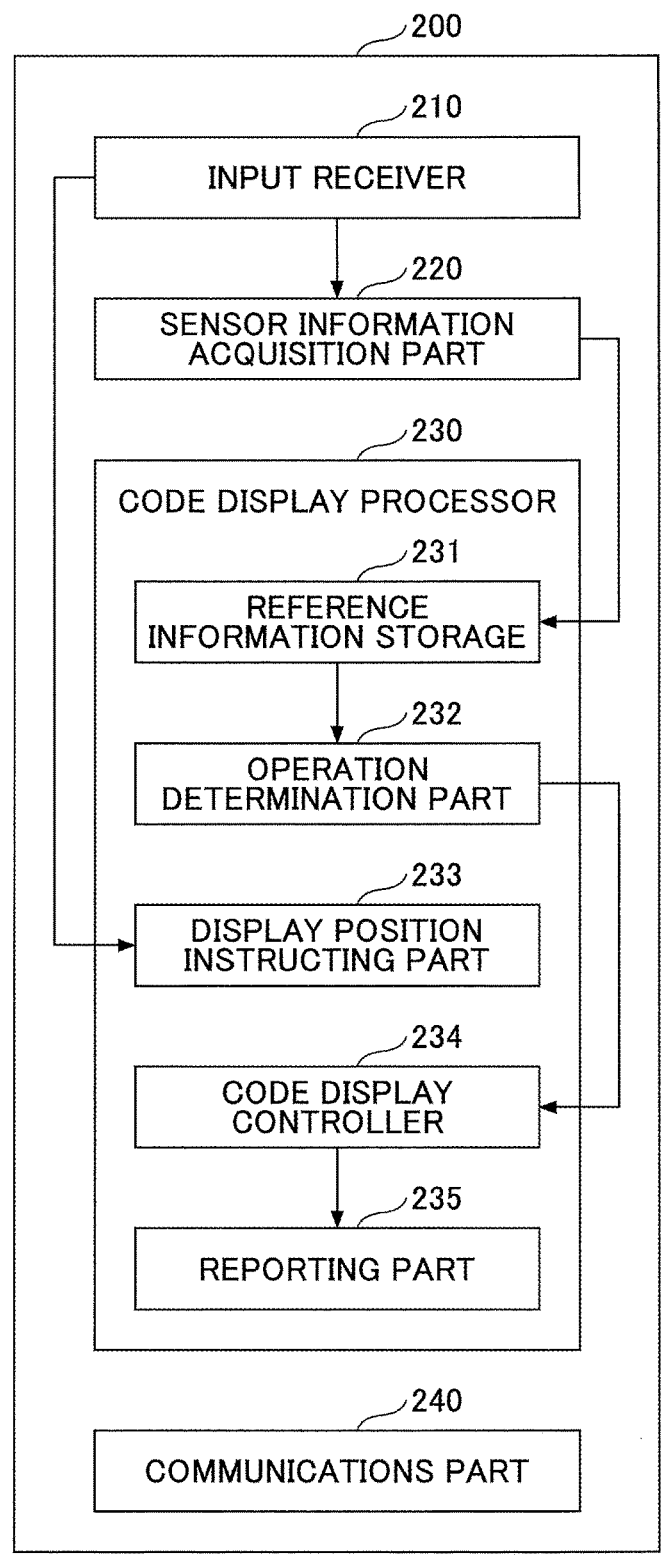
FIG. 4 is a diagram illustrating a functional configuration of the terminal apparatus.

Next, a functional configuration of the terminal apparatus 200 is illustrated with reference to FIG. 4. FIG. 4 is a diagram illustrating a functional configuration of the terminal apparatus 200.

The terminal apparatus 200 includes an input receiver 210, a sensor information acquisition part 220, a code display processor 230, and a communications part 240. The code display processor 230 is implemented by the CPU 16 executing a code display program. The parts other than the code display processor 230 are implemented by the CPU 16 executing programs corresponding to the respective parts.

The input receiver 210 is configured to receive the operational inputs of the user of the terminal apparatus 200. The sensor information acquisition part 220 is configured to acquire values detected by the various types of sensors included in the sensor group 14 of the terminal apparatus 200.

The code display processor 230 is configured to control display or non-display of the two-dimensional code. The details of the code display processor 230 will be described later. The communications part 240 is configured to perform various types of communications.

The code display processor 230 includes a reference information storage 231, an operation determination part 232, a display position instructing part 233, a code display controller 234, and a reporting part 235.

The reference information storage 231 is configured to store reference information referred to for determining an operation in the operation determination part 232 in a storage area in various types of memory or storage devices included in the terminal apparatus 200. The reference information includes value ranges of predetermined number of sensors, and information associated with operations of the user. Derails of the reference information will be described later.

The operation determination part 232 is configured to determine whether the values of the predetermined number of sensors acquired from the sensor information acquisition part 220 satisfy determination conditions. When the values of the predetermined number of sensors satisfy the determination conditions, the operation determination part 232 determines that the user has held the terminal apparatus 200 over the reader 500.

The determination conditions indicate that the values of the predetermined number of sensors fall within a range represented by the reference information within a predetermined time. That is, the operation determination part 232 determines whether the user has held the terminal apparatus 200 over the reader 500, based on the values of sensors acquired from the sensor group.

Note that the predetermined time may be 30 s from the time of receiving the two-dimensional code display instruction in the terminal apparatus 200. The details of the predetermined number of sensors and determination conditions will be described later.

The display position instructing part 233 is configured to display a marker indicating a position of the two-dimensional code to be displayed on the screen of the terminal apparatus 200.

The code display controller 234 is configured to control display or non-display of the two-dimensional code in accordance with a determination result made by the operation determination part 232. Note that the two-dimensional code may be stored in the terminal apparatus 200 in advance, or may be generated by the code display controller 234. To generate the two-dimensional code, the code display controller 234 generates the two-dimensional code based on the authentication information given in advance to the terminal apparatus 200.

The reporting part 235 is configured to report a reading result or an authentication result of the two-dimensional code performed by the information processing apparatus 300. Specifically, the reporting part 235 implements various types of reports by controlling a vibrating device, a speaker, and a light included in the terminal apparatus 200.

Note that the reference information and determination made by the operation determination part 232 are illustrated below.

Figure 5:
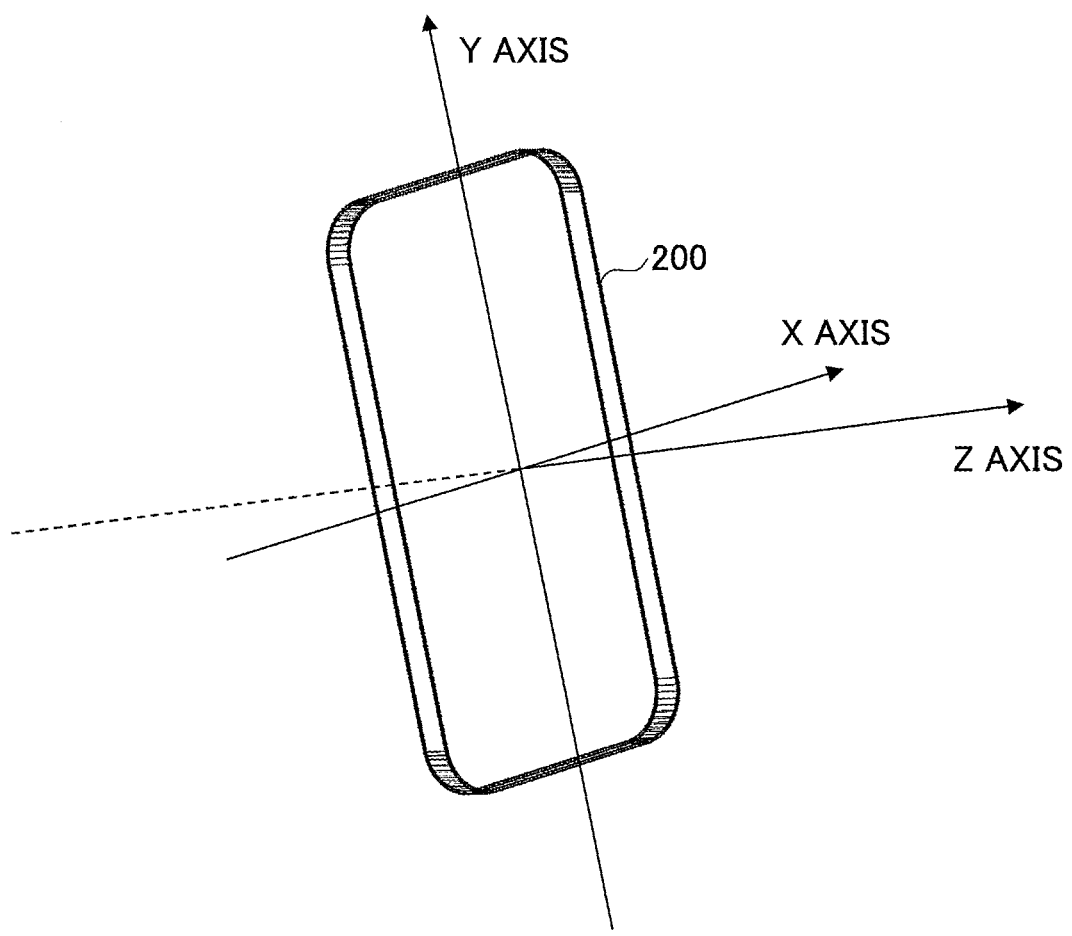
FIG. 5 is a diagram illustrating axes of a sensor group included in the terminal apparatus.

FIG. 5 is a diagram illustrating axes of a sensor group included in the terminal apparatus 200. The terminal apparatus 200 may, for example, have a rectangular tabular shape in a plan view as illustrated in FIG. 5.

In this case, a longitudinal direction, a short direction, and an orthogonal direction with respect to the screen of the terminal apparatus 200 represent a Y axis, an X axis, and a Z axis, respectively.

FIG. 6 is a diagram illustrating reference information. The terminal apparatus 200 stores value ranges of the sensors corresponding to operations as reference information 61 in the reference information storage 231. Note that the diagram in FIG. 6 illustrates the value ranges of the sensors included in the reference information 61 in association with operations of a terminal holder (i.e., the user of the terminal apparatus 200).

As illustrated in FIG. 6, the operations of the user associated with the value ranges of the sensors indicate types of the user's operations subject to detection in the code display processor 230.

The user's operations subject to detection in the embodiment include reversing the terminal apparatus 200, moving the terminal apparatus 200, and moving the screen of the terminal apparatus 200 close to another object.

Reversing the terminal apparatus 200 may be performed by the user of the terminal apparatus 200 after the user operates the screen of the terminal apparatus 200 to activate the code display program in order to move the screen of the terminal apparatus 200 in a direction toward the reader 500. Reversing the terminal apparatus 200 is hereinafter called an operation 1.

Moving the terminal apparatus 200 may be performed by the user in order to move the terminal apparatus 200 placed at hand of the user close to the reader 500. Moving the terminal apparatus 200 is hereinafter called an operation 2.

Moving the screen of the terminal apparatus 200 close to another object may be performed by the user of the terminal apparatus 200 in order to move the screen of the terminal apparatus 200 close to the reader 500. Moving the screen of the terminal apparatus 200 close to another object is hereinafter called an operation 3.

Initially, a value of the sensor corresponding to the operation 1 is illustrated. The operation 1 may be detected by any one of values of the gravity sensor, the gyroscope, and the angular sensor.

It is determined that the user has performed the operation 1 when the value of the gravity sensor achieves −8 to −10 m/s$^2$ in the Z axis of the terminal apparatus 200, or 8 to 10 m/s$^2$ in the Y axis of the terminal apparatus 200.

Note that the value of the gravity sensor that achieves −8 to −10 m/s$^2$ in the Z axis of the terminal apparatus 200 indicates that a reading face of the reader 500 is directed upward, and the terminal apparatus 200 is reversed to cover the reader 500 such that the screen of the terminal apparatus 200 is directed downward to face a floor surface.

Further, the value of the gravity sensor that achieves −8 to −10 m/s$^2$ in the Y axis of the terminal apparatus 200 indicates that the reading face of the reader 500 is directed toward an approximately horizontal direction to the floor face, and the terminal apparatus 200 directed upward is reversed to locate the surface of the terminal apparatus 200 approximately vertical to the floor surface.

Further, it is determined that the user has performed the operation 1 when the value of the gyroscope achieves 3 to 8 rad/s or −3 to −8 rad/s when the Y axis of the terminal apparatus 200 is the axis of rotation. Note that the rotational direction of the terminal apparatus 200 held with the user's right hand is reversed from the rotational direction of the terminal apparatus 200 held with the user's left hand. Thus, the reference information includes both the positive and negative value ranges.

Further, it is determined that the user has performed the operation 1 when the value of the angular sensor achieves 120 to 180 degrees or −120 to −180 degrees when the Y axis of the terminal apparatus 200 is the axis of rotation. Similar to the values of the gyroscope, the reference information also includes both the positive and negative value ranges of the angular sensor, considering detection of the values when the terminal apparatus 200 is held both with the user's right hand and left hand.

Next, a value of the sensor corresponding to the operation 2 is illustrated. The operation 2 is detected by the value of the acceleration sensor.

It is determined that the user has performed the operation 2 when the value of the acceleration sensor achieves −9 to −12 m/s$^2$ in the Z axis of the terminal apparatus 200, or 10 to 16 m/s$^2$ in the Y axis of the terminal apparatus 200. In this case, both the value ranges are set both in the Z axis and Y axis of the acceleration sensor as the references in order to detect the values when the terminal apparatus 200 is held both with the user's right hand and left hand.

Next, a value of the sensor corresponding to the operation 3 is illustrated. The operation 3 is detected by the value of the proximity sensor.

It is determined that the user has performed the operation 3 when the value of the proximity sensor falls within 5 cm for 0.5 s.

As described above, operation types of the terminal holder (the user of the terminal 200) are associated with value ranges of the sensors indicating that the respective operations have been performed.

The following illustrates a method of determining the value ranges of the respective sensors.

The value ranges of the sensors corresponding to the operations are determined based on values acquired as a result of several operations of the terminal holder (the user of the terminal 200) from holding the terminal apparatus 200 to directing the screen of the terminal apparatus 200 close to the reader 500.

Specifically, the terminal holder (the user of the terminal 200) holds the terminal apparatus 200 with the user's left hand, and the user repeats directing the screen of the terminal apparatus 200 close to the reader 500 having a reading surface upward predetermined times. Thus, the values of the gravity sensor, the gyroscope, the angular sensor, the acceleration sensor, and the proximity sensor for the predetermined times may be obtained.

Similarly, the terminal holder (the user of the terminal 200) holds the terminal apparatus 200 with the user's right hand, and the user repeats directing the screen of the terminal apparatus 200 close to the reader 500 having the reading surface upward predetermined times. The values of the gravity sensor, the gyroscope, the angular sensor, the acceleration sensor, and the proximity sensor for the predetermined times may thus be obtained.

Similarly, the terminal holder (the user of the terminal 200) holds the terminal apparatus 200 with the user's left hand, and the user repeats directing the screen of the terminal apparatus 200 close to the reader 500 having the reading surface in an approximately horizontal direction to the floor surface predetermined times. The values of the gravity sensor, the gyroscope, the angular sensor, the acceleration sensor, and the proximity sensor for the predetermined times may thus be obtained.

Similarly, the terminal holder (the user of the terminal 200) holds the terminal apparatus 200 with the user's right hand, and the user repeats directing the screen of the terminal apparatus 200 close to the reader 500 having the reading surface in an approximately horizontal direction to the floor surface predetermined times. The values of the gravity sensor, the gyroscope, the angular sensor, the acceleration sensor, and the proximity sensor for the predetermined times may thus be obtained.

In this embodiment, when the user of the terminal apparatus 200 (the terminal holder) repeats holding the terminal apparatus 200 over the reader 500, the user starts moving the terminal apparatus 200 from the state of the upper side of the screen being inclined toward the user's body, or from the state of the lower side of the screen being inclined toward the user's body. Further, when the user of the terminal apparatus 200 (the terminal holder) repeats holding the terminal apparatus 200 over the reader 500, the user may quickly hold the terminal apparatus 200 over the reader 500, or may slowly hold the terminal apparatus 200 over the reader 500.

The value ranges of the sensors may include all the values of the sensors acquired by the above-described operations.

For example, the value ranges of the gravity sensor may be −8 to −10 m/s$^2$ in the Z axis of the terminal apparatus 200 or 8 to 10 m/s$^2$ in the Y axis of the terminal apparatus 200. These ranges include all the values of the gravity sensor acquired as a result of the above-described repeated operations.

Likewise, the value ranges of the gyroscope may be 3 to 8 rad/s or −3 to −8 rad/s when the Y axis of the terminal apparatus 200 is the rotational axis. These ranges include all the values of the gyroscope acquired as a result of the above-described repeated operations.

The value ranges of the angular sensor, the acceleration sensor, and the proximity sensor may be similar to those of the gravity sensor and the gyroscope.

Note that when the terminal holder gives the two-dimensional code display instruction, and respective values of the sensors with respect to the X axis, the Y axis, and the Z axis of the terminal apparatus 200 are represented by x, y, and z, the mean values of the sensors at the start of the operations of holding the terminal apparatus 200 over the reader 500 are as follows.

The values of the gravity sensor: (−2, 3, 9) m/s$^2$
The values of the gyroscope: (0.7, 1.2, 1) rad/s
The values of the angular sensor: (−40, 5, 40) degrees
The values of the acceleration sensor: (0, 5, 9) m/s$^2$
The value of the proximity sensor: no object within 5 cm from the screen Next, determination conditions are illustrated. The determination conditions include both the operation 1 and operation 3 being detected within a predetermined time, or both the operation 2 and operation 3 being detected within a predetermined time. The predetermined time in this embodiment may be 1 min.

Specifically, the determination condition may be any one of the values of the gravity sensor, the gyroscope, and the angular sensor falling within a range of the values determined by the reference information 61 for each of the sensors, and the value of the proximity sensor falling within a range determined by the reference information 61 within 1 min.

Further, the determination condition may be that the value of the acceleration sensor falls within a range of the values determined by the reference information 61, and the value of the proximity sensor falls within a range of the values determined by the reference information 61 within 1 min.

In other words, the determination condition indicates that the values of the predetermined number of sensors fall within respective ranges of the values determined by the reference information 61 within a predetermined time.

The determination condition may be a combination of the above-described two conditions. More specifically, the determination condition may include that any one of the values of the gravity sensor, the gyroscope, and the angular sensor, and the value of the acceleration sensor fall within ranges of the values determined by the reference information 61, and the value of the proximity sensor falls within a range of the values determined by the reference information 61 within 1 min. As described above, when the determination condition is a combination of the operations 1 to 3, accuracy in the detection of the operation of holding the terminal apparatus 200 over the reader 500 may be improved.

In the following description, the operation of holding the terminal apparatus 200 over the reader 500 determined based on the determination condition is called an "authentication operation".

Figure 7:
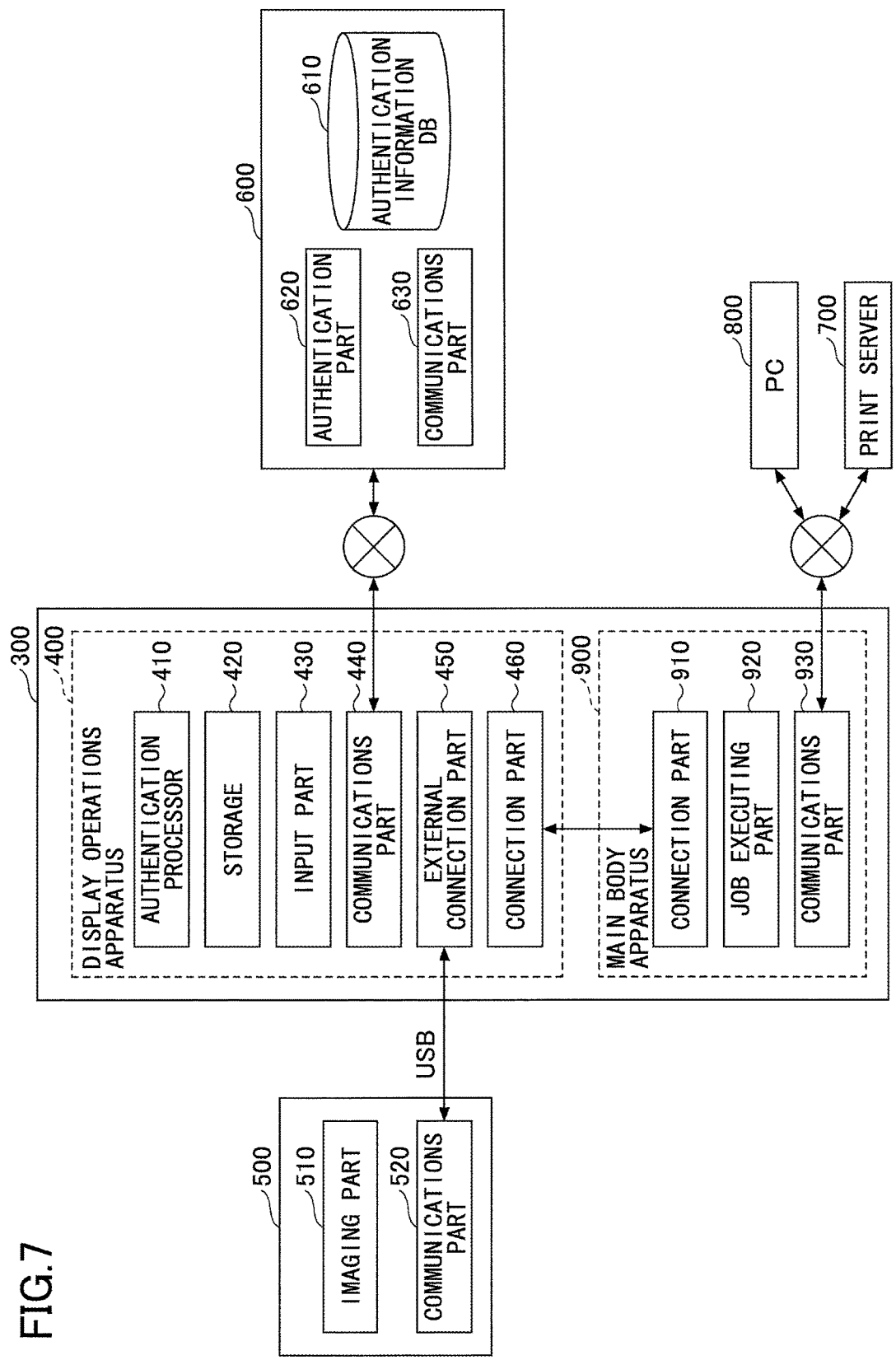
FIG. 7 is a diagram illustrating a functional configuration of the information processing apparatus.

Next, a functional configuration of the information processing apparatus 300 is illustrated with reference to FIG. 7. FIG. 7 is a diagram illustrating a functional configuration of the information processing apparatus 300.

The display operations apparatus 400 included in the information processing apparatus 300 includes an authentication processor 410, a storage 420, an input part 430, a communications part 440, an external connection part 450, and a connection part 460. The main body apparatus 900 included in the information processing apparatus 300 includes a connection part 910, a job executing part 920, and a communications part 930.

Initially, a description is given of the parts included in the display operations apparatus 400. The parts included in the display operations apparatus 400 may be implemented by causing the CPU 41 included in the display operations apparatus 400 to read programs stored in the ROM 42, or the RAM 43, and execute the read programs.

The authentication processor 410 is configured to acquire a two-dimensional code image read by and transmitted from the reader 500, decode the two-dimensional code to extract authentication information, and perform an authentication process. Note that the display operations apparatus 400 may store an authentication information database being referred to in the authentication process of the authentication processor 410. The authentication processor 410 may authenticate the user of the terminal apparatus 200 when the information matching the authentication information extracted from the two-dimensional code is present in the authentication information database.

Further, the authentication processor 410 may transmit the authentication information extracted from the two-dimensional code to the authentication server 600. Details of a functional configuration of the authentication server 600 will be described later.

The display operations apparatus 400 may be operable when the authentication performed based on the authentication information is successful. The display operations apparatus 400 is provided with the authentication processor 410; however, the configuration of the display operations apparatus 400 is not limited to this example. The information processing apparatus 300 may perform an authentication process in the main body apparatus 900. Further, the information processing apparatus 300 may decode the two-dimensional code in the main body apparatus 900.

The storage 420 is configured to store information in a storage device such as the ROM 42, the RAM 43, or the flash memory 44. Specifically, the storage 420 stores authentication information obtained by decoding the two-dimensional code in the storage device.

The input part 430 is configured to receive operations input by a user. The operations input by the user in the embodiment include displaying, executing, and setting the job list, for example.

The communications part 440 is configured to perform communications with the authentication server 600 via the network. The external connection part 450 is configured to connect the display operations apparatus 400 to the reader 500. The external connection part 460 is configured to connect the display operations apparatus 400 to the reader 900.

Next, an illustration is given of the parts included in the main body apparatus 900. The main body apparatus 900 includes a connection part 910, a job executing part 920, and a communications part 930.

The connection part 910 is configured to connect the main body apparatus 900 to the display operations apparatus 400. The job executing part 920 is configured to execute jobs such as an image forming job. The jobs specifically include printing, scanning, and facsimile transmission. The communications part 930 is configured to transmit and receive information via the network.

Next, an illustration is given of functional configurations of the reader 500 and the authentication server 600.

The reader 500 includes an imaging part 510, and a communications part 520. The imaging part 510 serves as a camera function configured to capture images. The imaging part 510 may capture an image when the imaging part 510 has detected the approach of the terminal apparatus 200.

The communications part 520 is configured to transmit an image captured by the imaging part 510 as image data to the display operations apparatus 400. The communications part 520 may transmit a reading start report indicating that the reading of the image has started to the display operations apparatus 400 when detecting the approach of the terminal apparatus 200.

The authentication server 600 includes an authentication database 610, an authentication part 620, and a communications part 630.

The authentication database 610 is configured to store authentication information. The authentication information includes a user ID, a phone number of the terminal apparatus 200, and a password. The authentication information stored in the authentication database 610 of the authentication server 600 may be associated with a name, an assigned department, and an email address of the user.

The authentication part 620 is configured to compare information transmitted from the information processing apparatus 300 and information stored in the authentication database 610, and transmit the compared result to the information processing apparatus 300. Note that the authentication server 600 may include a code generator configured to generate a two-dimensional code using the user ID and the password included in the authentication information stored in the authentication database 610, and authentication information transmitter configured to transmit the two-dimensional code to the mail address of the terminal apparatus 200 associated with personal information.

The communications part 630 is configured to perform communications between the authentication server 600 and the display operations apparatus 400.

Figure 8:
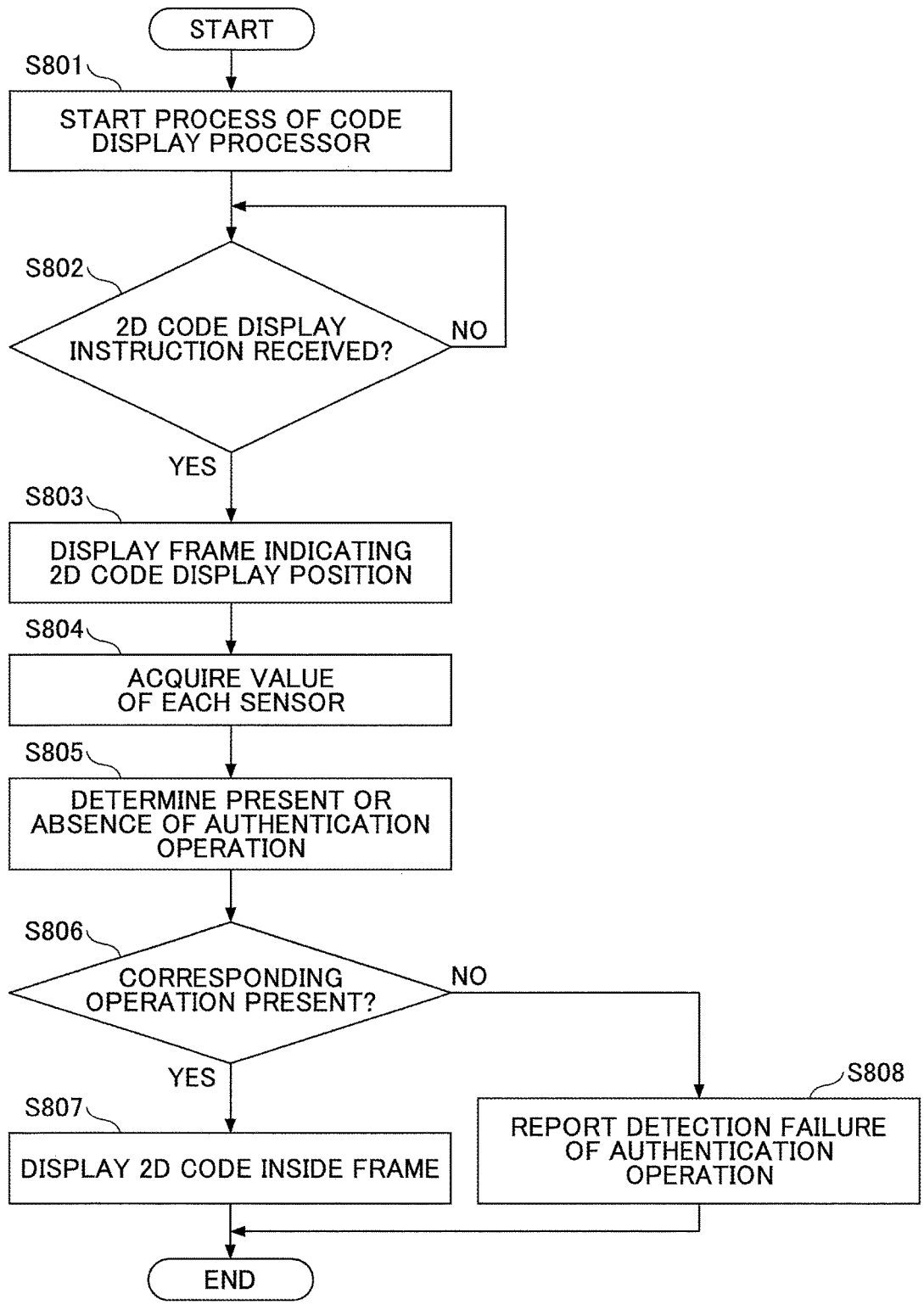
FIG. 8 is a flowchart illustrating operations of the terminal apparatus.

Next, an illustration is given of operations of the terminal apparatus 200. FIG. 8 is a flowchart illustrating operations of the terminal apparatus 200.

When the code display program is activated to start a process of the code display processor 230 (step S801), the terminal apparatus 200 determines whether a two-dimensional code display instruction is received by the input receiver 210 (step S802).

When the two-dimensional code display instruction is not received in step S802, the terminal apparatus 200 remains in a standby mode until the terminal apparatus 200 receives the two-dimensional code display instruction.

On the other hand, when the two-dimensional code display instruction is received in step S802, the code display processor 230 causes the display operations device 11 of the terminal apparatus 200 via the display position instructing part 233 to display a frame indicating a position at which the two-dimensional code is displayed (step S803). Note that the target indicating the two-dimensional code display position is not limited to the above frame. The display position of the two-dimensional code may be indicated by a display component such as arrows or marks.

The terminal apparatus 200 subsequently causes the sensor information acquisition part 220 to acquire sensor values of the sensors in the sensor group 14 (step S804). The sensor information acquisition part 220 acquires, from the sensors of the sensor group 14, values of the sensors having predetermined value ranges in the reference information stored in the reference information storage 231.

Specifically, the sensor information acquisition part 220 at least acquires a value of any one of the gravity sensor, the gyroscope, and the angular sensor; a value of the acceleration sensor; and a value of the proximity sensor, among the sensors included in the sensor group 14. That is, a predetermined number of sensors indicates any one of the gravity sensor, the gyroscope and the angular sensor; the acceleration sensor; and the proximity sensor.

The code display processor 230 subsequently causes the operation determination part 232 to determine the presence or absence of the authentication operation (step S805). The authentication operation indicates holding the display operations device 11 of the terminal apparatus 200 over the reader 500; that is, the authentication operation involves placing the display operations device 11 of the terminal apparatus 200 close to the reader 500.

Specifically, the operation determination part 232 compares the values of the predetermined number of sensors acquired from the sensor information acquisition part 220 and the reference information to determine whether the values of the predetermined number of sensors satisfy the determination conditions.

In step S806, when it is determined that the authentication operation is present (YES in step S806), the code display processor 230 causes the code display controller 234 to display the two-dimensional code inside the frame (step S807) indicated in step S803, and ends the process.

In step S806, when it is determined that the authentication operation is not present (No in step S806), the code display processor 230 causes the code display controller 234 not to display the two-dimensional code, causes the reporting part 235 to report that detection of the authentication operation has failed (step S808), and ends the process. Specifically, the terminal apparatus 200 has timed from the display instruction in step S802, and determines that the detection of the authentication operation has failed when the terminal apparatus 200 is unable to detect the authentication operation within a predetermined time (e.g., within 30 s).

Figure 9C:
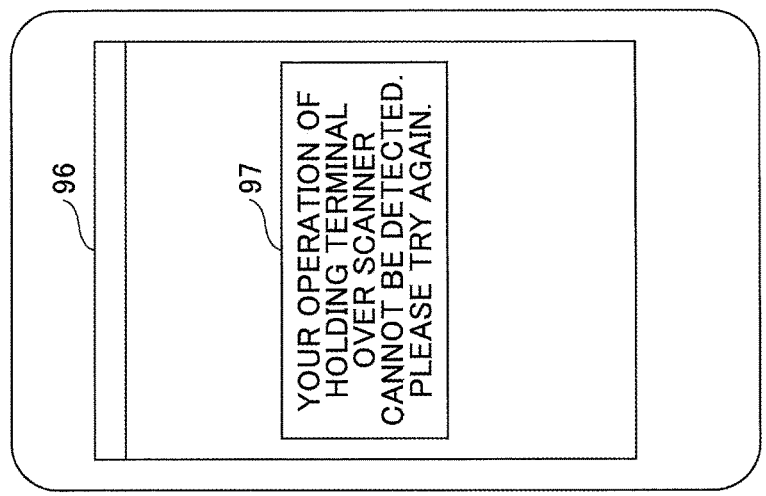
FIGS. 9A to 9C are diagrams illustrating examples of display of the terminal apparatus.
Figure 9B:
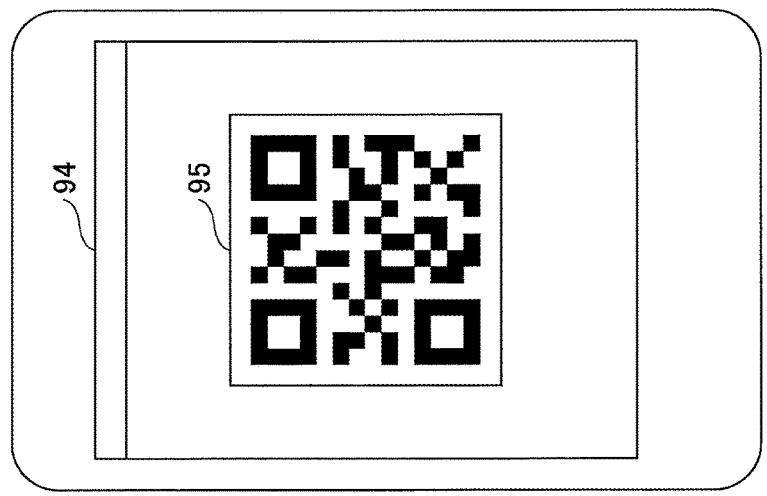
Figure 9A:
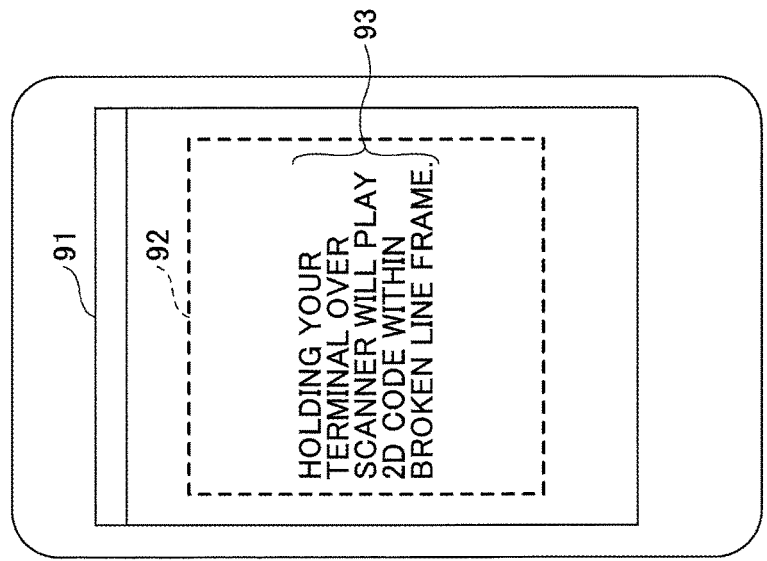

Next, the two-dimensional code display of the terminal apparatus 200 is illustrated with reference to FIGS. 9A to 9C. FIGS. 9A to 9C are diagrams illustrating examples of display of the terminal apparatus 200. FIG. 9A illustrates a display example of the frame indicating the display position of the two-dimensional code. FIG. 9B illustrates a display example of the two-dimensional code. FIG. 9C illustrates a display example of a report indicating that the detection of the authentication operation has failed.

When the code display processor 230 receives the two-dimensional code display instruction, the code display processor 230 displays a frame 92 indicating the two-dimensional code display position on the screen 91, as illustrated in FIG. 9A. The code display processor 230 also displays a message 93 inside the frame 92 reporting that the two-dimensional code will be displayed inside the frame 92.

In this embodiment, when the display instruction is received from the user, the two-dimensional code display position on the screen 91 is reported to the user by displaying the frame. This enables the user to recognize the two-dimensional code display position before the user performs the authentication operation.

When it is determined that the authentication operation has been performed, the code display processor 230 causes the code display controller 234 to display a two-dimensional code 95 on a screen 94.

Further, when it is determined that the authentication operation has not been performed, the code display processor 230 will stop displaying the two-dimensional code 95, and cause the reporting part 235 to display a report 97 having a message such as "Your operation of holding the terminal over the scanner cannot be detected. Please try again." (see FIG. 9C). Note that FIG. 9C illustrates a message indicating that the detection of the authentication operation has failed as an example of the report 97; however, the report 97 is not limited to such a message on the screen. The reporting part 235 may report that the detection of the authentication operation has failed by vibrating the terminal apparatus 200, or lighting an LED or the like included in the terminal apparatus 200, in addition to the above-described report 97.

Next, operations of an authentication system 100 is illustrated with reference to FIG. 10. FIG. 10 is a sequence diagram illustrating operations of an authentication system 100. Note that the operations illustrated in FIG. 10 indicates operations when the two-dimensional code is displayed as a result of successful detection of the authentication operation, and authentication performed by the authentication server 600 based on the authentication information extracted from the two-dimensional code is successful.

In the authentication system 100, the terminal apparatus 200 determines that the authentication operation of the user has been performed (step S1001). The reporting device 20 subsequently display the two-dimensional code on the screen of the display operations device 11 (step S1002).

When the two-dimensional code is displayed, the reader 500 causes the authentication database 610 to acquire an image of the screen displaying the two-dimensional code (step S1003). The reader 500 subsequently transmits image data of the acquired image to the display operations apparatus 400 of the information processing apparatus 300 (step S1004).

The display operations apparatus 400 that has received the image data reports a reading result of the two-dimensional code (step S1005). Since the display operations apparatus 400 has acquired the image data of the screen displaying the two-dimensional code, the display operations apparatus 400 may display the screen reporting to the user that reading of the two-dimensional code has succeeded.

The display operations apparatus 400 subsequently decodes the two-dimensional code included in the image data, and extracts authentication information (step S1006). The display operations apparatus 400 subsequently transmits the extracted authentication information and an authentication request to the authentication server 600 (step S1007).

The authentication server 600 receives the authentication information and the authentication request, and causes the authentication part 620 to perform an authentication process (step S1008). The authentication server 600 subsequently transmits an authentication result and terminal information to the display operations apparatus 400 (step S1009).

Note that the terminal information may be identification information of the terminal apparatus 200 uniquely specifying the terminal apparatus 200 that may be stored in the authentication database 610 in association with the authentication information. Further, when the authentication information extracted from the two-dimensional code includes the terminal information, the authentication server 600 may transmit only the authentication result to display operations apparatus 400.

The display operations apparatus 400 that has received the authentication result allows the display operations apparatus 400 and the main body apparatus 900 to be accessible, and reports that the information processing apparatus 300 is accessible (usable) in the display operations apparatus 400 (step S1010).

The display operations apparatus 400 that has received the authentication result also transmits the authentication result to the terminal apparatus 200 specified based on the terminal information (step S1011).

The terminal apparatus 200 that has received the authentication result causes the reporting part 235 to transmit a report in accordance with the authentication result (step S1012). The example of the report illustrated in FIG. 10 is the report indicating that the authentication has succeeded transmitted to the user.

As described above, when the authentication based on the two-dimensional code is successful, the user is allowed to use the information processing apparatus 300.

Note that in the example of FIG. 10, the authentication based on the authentication information extracted from the two-dimensional code is only performed by the authentication server 600. However, the authentication based on the authentication information extracted from the two-dimensional code is not limited to being performed by the authentication server 600.

For example, the display operations apparatus 400 may cause the authentication processor 410 of the own apparatus to perform the authentication process when the authentication information is extracted from the two-dimensional code in step S1005. The display operations apparatus 400 then proceeds with a process in step S1009.

Further, the display operations apparatus 400 may cause the authentication processor 410 to perform the authentication process using the authentication information extracted in step S1005, and may transmit the authentication information together with the authentication request to the VCSEL 60 when the authentication is successful.

Next, an illustration is given, with reference to FIG. 11, of operations after the determination of the authenticate operation being performed in the terminal apparatus 200.

FIG. 11 is a flowchart illustrating operations after the authentication operation being performed is determined in the terminal apparatus.

The terminal apparatus 200 causes the code display controller 234 to execute a two-dimensional code display process (step S1101).

The terminal apparatus 200 subsequently determines whether the authentication result has been received from any one of the display operations apparatus 400, the information processing apparatus 300, and the authentication server 600 via the communications part 240 (step S1102). Note that the authentication result received in step S1102 may be the authentication result transmitted by the authentication processor 410 of the display operations apparatus 400, or the authentication result performed by the authentication part of the authentication server 600. That is, the authentication result received in step S1102 may be any information insofar as the information indicates that the authentication based on the authentication information extracted from the two-dimensional code has succeeded.

When the authentication result is received in step S1102, the terminal apparatus 200 causes the reporting part 235 to report that the authentication result has been received to the user (step S1103). The terminal apparatus 200 subsequently causes the code display controller 234 not to display the two-dimensional code (step S1104), and ends the process.

In this embodiment, the fact that the terminal apparatus 200 has received the authentication result from the display operations apparatus 400 is considered to indicate that the two-dimensional code displayed on the terminal apparatus 200 is read by the display operations apparatus 400, regardless of the authentication being successful or having failed. Thus, when the terminal apparatus 200 receives the authentication result, it is assumed that the two-dimensional code is displayed on the terminal apparatus 200, and the code display controller 234 will stop displaying the two-dimensional code.

As described above, display of the two-dimensional code will be stopped after the two-dimensional code is read, which may prevent the two-dimensional code from being surreptitiously photographed when the user moves the terminal apparatus 200 from the reader 500.

When the terminal apparatus 200 has not received the authentication result in step S1102, the terminal apparatus 200 determines whether a predetermined time has elapsed (step S1105). When the predetermined time has not elapsed in step S1105, the terminal apparatus 200 returns to step S1102. The predetermined time may be 10 s from the time at which the terminal apparatus 200 has determined that the authentication operation has been performed.

When the predetermined time has elapsed in step S1105, the terminal apparatus 200 determines whether the two-dimensional code is displayed on the terminal apparatus 200 (step S1106). Specifically, the terminal apparatus 200 determines whether an execution result of the process in step S1101 results in an error. In addition, the terminal apparatus 200 may determine that the two-dimensional code is not displayed on the screen when the brightness of the screen is less than predetermined luminance or when the screen is not displayed.

In step S1106, when the terminal apparatus 200 determines that the two-dimensional code is displayed, the terminal apparatus 200 proceeds with step S1104.

In step S1106, when the terminal apparatus 200 determines that the two-dimensional code is not displayed on the screen in step S1106, the terminal apparatus 200 causes the reporting part 235 to report that the two-dimensional code is not displayed (step S1107). The reporting part 235 may causes the user holding the terminal apparatus 200 to notice such a report without encouraging the user to look at the screen of the terminal apparatus 200. Specifically, the reporting part 235 blinks an LED light or the like included in the terminal apparatus 200 or vibrates the terminal apparatus 200.

As described above, the user will be informed of the reason why the authentication is not correctly performed by receiving the report when the two-dimensional code is not displayed on the screen of the terminal apparatus 200 after the authentication operation being performed is determined. That is, it is possible to inform the user that the terminal apparatus 200 has not correctly performed authentication when the two-dimensional code is not displayed on the terminal apparatus 200.

Figure 12:
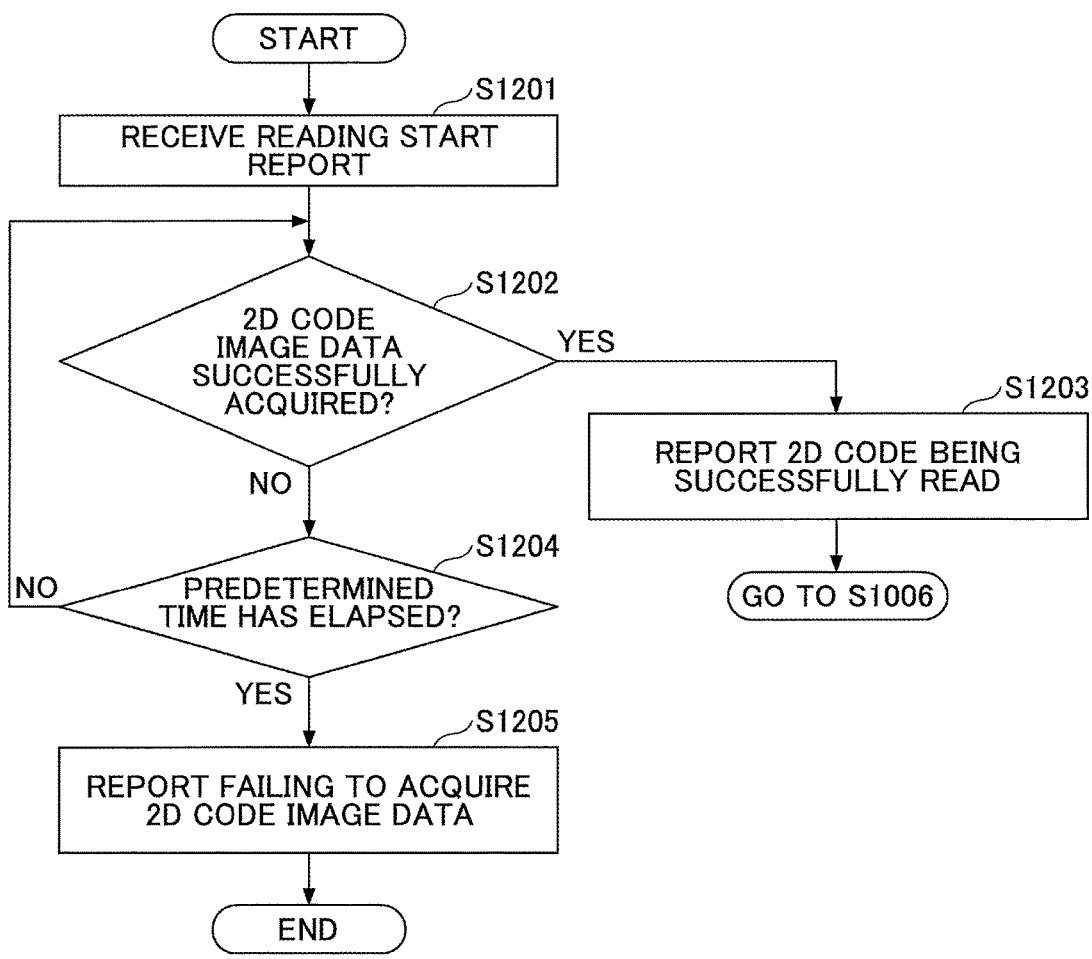
FIG. 12 is a first flowchart illustrating operations of a display operations apparatus 400 after an authentication result is received.

Next, an illustration is given, with reference to FIG. 12, of operations of the display operations apparatus 400 after the authentication result is received. FIG. 12 is a first flowchart illustrating operations of the display operations apparatus 400 after the authentication result is received.

When the display operations apparatus 400 receives an image reading start report in the reader 500 (step S1201), the authentication processor 410 determines whether image data of the image displaying two-dimensional code have been acquired (step S1202).

When the image data of the image displaying two-dimensional code have been acquired in step S1202, the display operations apparatus 400 causes the authentication processor 410 to report that the two-dimensional code has been read (step S1203), and proceeds with step S1006 illustrated in FIG. 10.

When the image data of the image displaying two-dimensional code have not been acquired in step S1202, the authentication processor 410 determines whether a predetermined time has elapsed (step S1204). When the predetermined time has not elapsed in step S1204, the terminal apparatus 410 returns to step S1202.

When the predetermined time has elapsed in step S1204, the terminal apparatus 410 reports that acquisition of the image data of the image displaying the two-dimensional code has failed (step S1205).

Next, the report in the display operations apparatus 400 is described. The display operations apparatus 400 transmits a report to the operations panel 47 by displaying a message indicating report content.

Figure 13A:
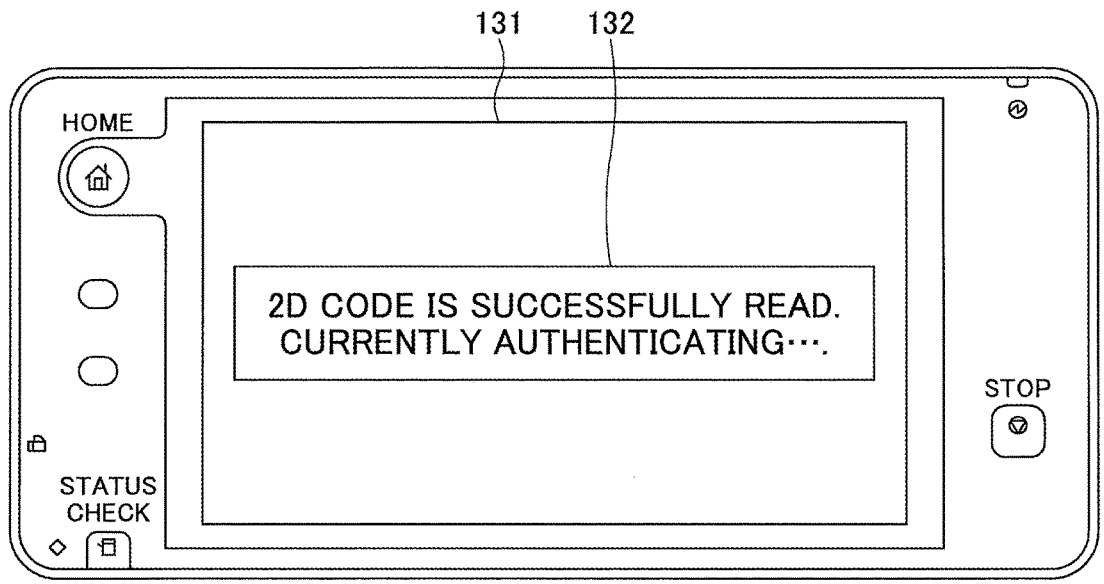
FIGS. 13A and 13B are first diagrams illustrating examples of display in the display operations apparatus.
Figure 13B:
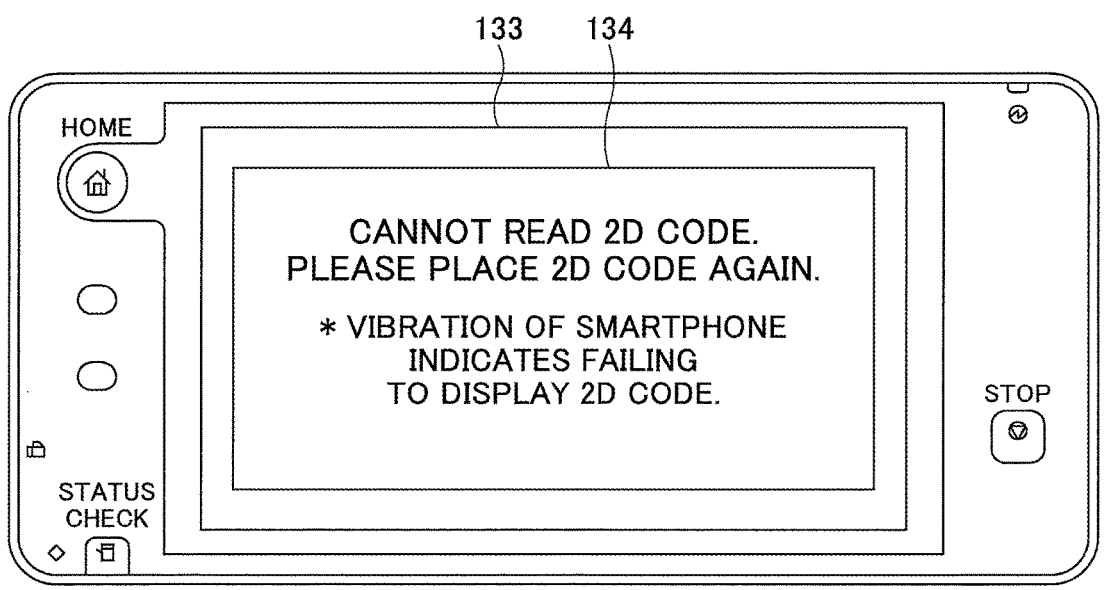

FIGS. 13A and 13B are first diagrams illustrating examples of display in the display operations apparatus 400. FIG. 13A illustrates a screen example displaying report content in step S1203. FIG. 13A illustrates a screen example displaying report content in step S1205.

The screen 131 illustrated in FIG. 13A is an example of the report screen displayed on the operations panel 47, and displays a message 132 indicating that the reading of the two-dimensional code has succeeded.

The screen 133 illustrated in FIG. 13B is an example of the report screen displayed on the operations panel 47, and displays a message 134 indicating that the reading of the two-dimensional code has failed.

According to the embodiment, the display operations apparatus 400 may thus enable the user present in front of the information processing apparatus 300 to recognize progress of the authentication process by displaying the message on the operations panel 47 of the display operations apparatus 400.

In addition, the message 134 may include a message "vibration of smartphone indicates failing to display the two-dimensional code" to inform the user of reading failure of the two-dimensional code by the reader 500 or the terminal apparatus 200.

Note that in this case, the display operations apparatus 400 includes contents of a message 134 that are associated in advance with the types of the reports transmitted when the two-dimensional code is not displayed on the terminal apparatus 200.

Figure 14:
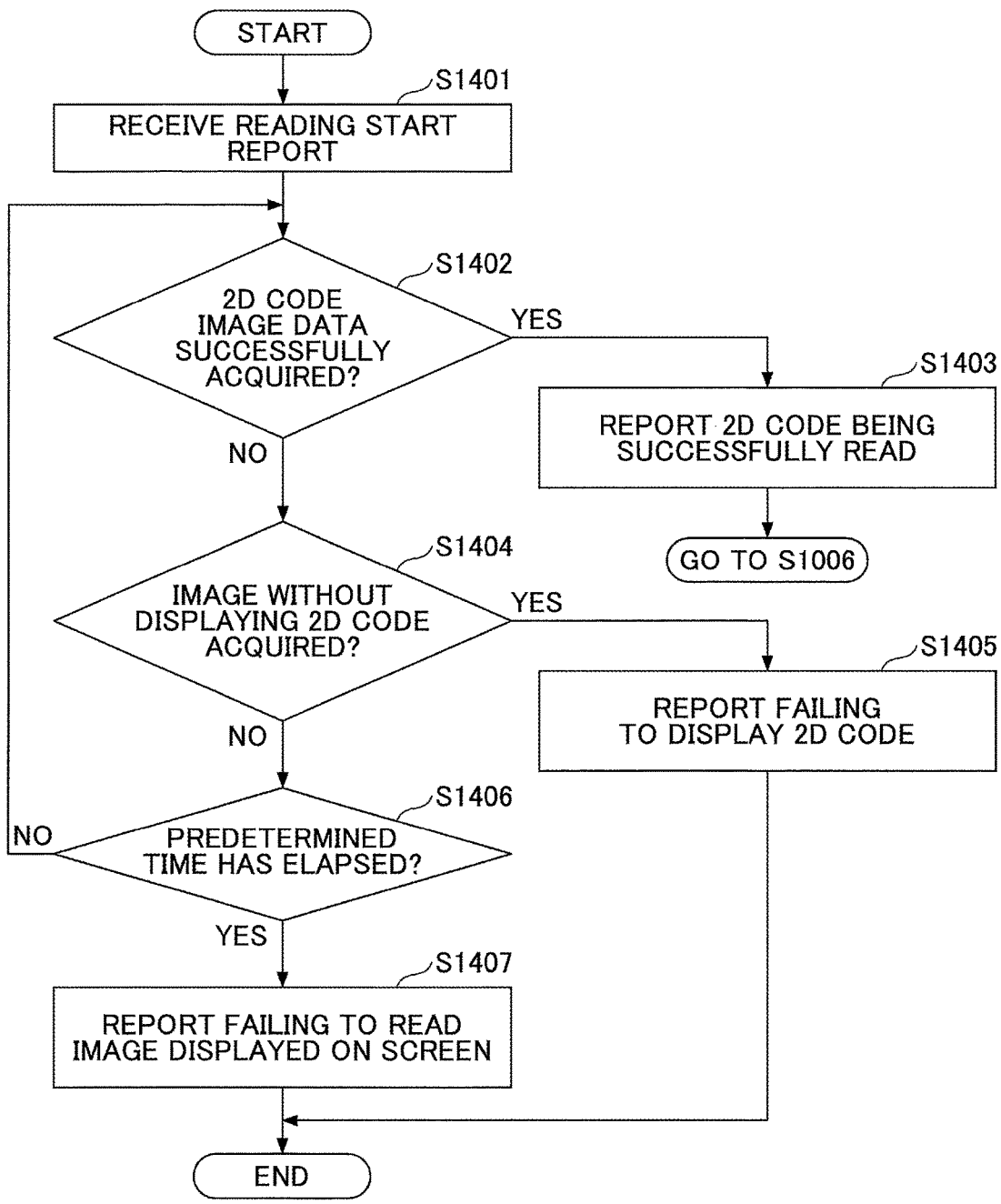
FIG. 14 is a second flowchart illustrating operations of the display operations apparatus after an authentication result is received.

Next, an illustration is given, with reference to FIG. 14, of operations of the display operations apparatus 400 after the authentication result has been received. FIG. 14 is a second flowchart illustrating operations of the display operations apparatus after an authentication result is received. As illustrated in FIG. 14, the display operations apparatus 400 presents a report based on whether the display operations apparatus 400 has received some kind of image data.

The processes from step S1401 to step S1403 of FIG. 14 are similar to those from step S1201 to step S1203, and a duplicated description is thus omitted from the specification.

When the image data of the image displaying the two-dimensional code is not acquired in step S1402, the authentication processor 410 determines whether image data of an image without displaying the two-dimensional code have been acquired (step S1404). Specifically, the authentication processor 410 determines whether the image data of some kind of an image have been acquired when reading of the two-dimensional code has failed in the processes illustrated in FIG. 14.

When the image data have been acquired in step S1404, the authentication processor 410 reports that displaying of the two-dimensional code on the terminal apparatus 200 has failed (step S1405), and ends the process.

A case where the display operations apparatus 400 has acquired from the terminal apparatus 200 image data of the image without displaying the two-dimensional code indicates that the terminal apparatus 200 displays some kind of an image other than the image of the two-dimensional code. In this case, it is assumed that the process of displaying the two-dimensional code is not executed in the terminal apparatus 200. Thus, a report indicating failing to display the two-dimensional code is presented in this embodiment.

When the image data have not been acquired in step S1404, the authentication processor 410 determines whether a predetermined time has elapsed (step S1406). When the predetermined time has not elapsed in step S1406, the authentication processor 410 returns to step S1402.

When the predetermined time has elapsed in step S1406, the authentication processor 410 reports that acquisition of the image data of the image displayed on the terminal apparatus 200 has failed (step S1407), and ends the process.

A case where the predetermined time has elapsed in step S1406 indicates failing to read any kind of images from the image data obtained by imaging the screen of the terminal apparatus 200. In step S1407, the authentication processor 410 reports failure to read the image displayed on the terminal apparatus 200.

Figure 15A:
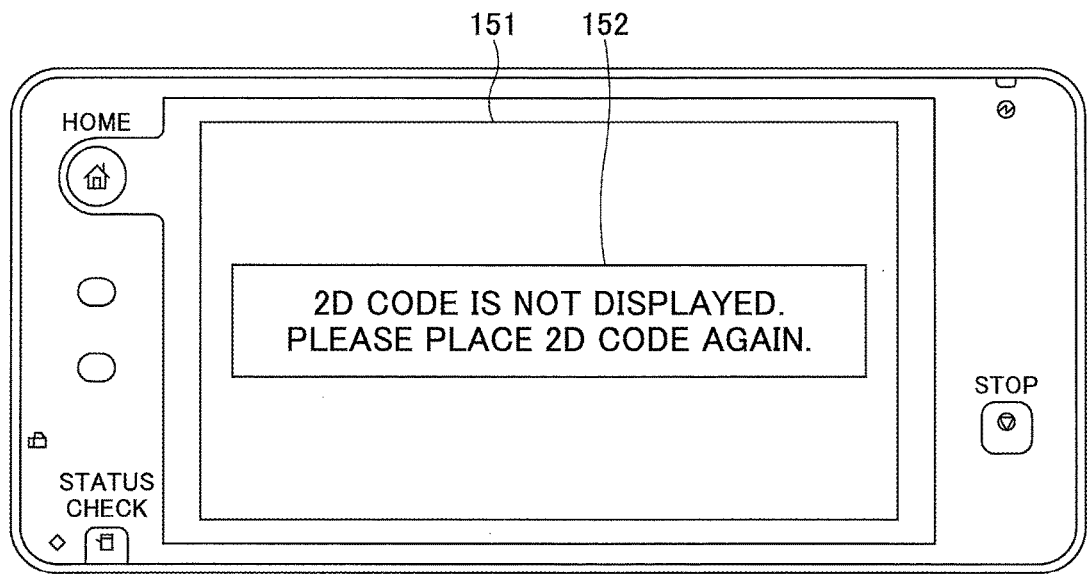
FIGS. 15A and 15B are second diagrams illustrating examples of display in the display operations apparatus.
Figure 15B:
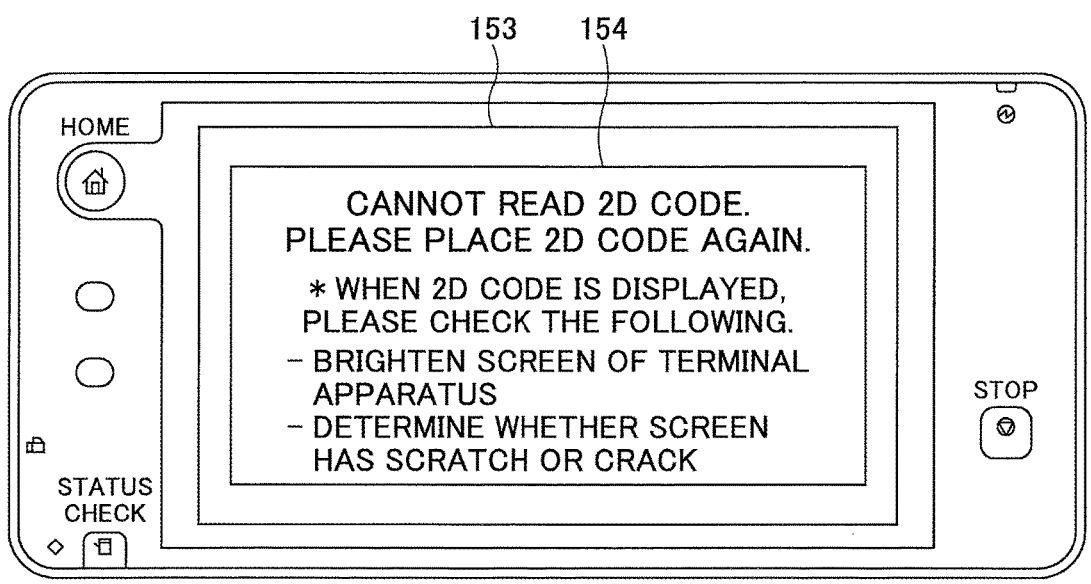

FIGS. 15A and 15B are second diagrams illustrating examples of display in the display operations apparatus 400. FIG. 15A illustrates a screen example displaying report content in step S1405. FIG. 15B illustrates a screen example displaying report content in step S1407.

The screen 151 illustrated in FIG. 15A is an example of the report screen displayed on the operations panel 47, and displays a message 152 indicating that displaying of the two-dimensional code has failed.

In this embodiment, the display operations apparatus 400 may be able to inform the user who waits for a report of the authentication result, while holding the terminal apparatus 200 over the reader 500, that the terminal apparatus 200 does not display the two-dimensional code by displaying the message 152.

The screen 153 illustrated in FIG. 15B is an example of the report screen displayed on the operations panel 47, and displays a message 154 indicating that reading of the two-dimensional code displayed on the terminal apparatus 200 has failed. The message 154 includes a message "when the two-dimensional code is displayed on the terminal apparatus 200, please check the following. —Brighten the screen of the terminal apparatus 200. —Make sure whether the screen has scratch or crack".

The message 154 may include content that encourage the user to check the screen condition of the terminal apparatus 200, which may encourage the user to operate the terminal apparatus 200 to allow the image displayed on the terminal apparatus 200 to be readable.

The display operations apparatus 400 may be able to indicate the user the causes of failing to correctly perform authentication by displaying the message illustrated in FIGS. Sound-voice input part Sound-voice input part 15a and 15B on the operations panel 47 of the display operations apparatus 400.

According to the disclosed technology, it may be possible to control the leakage of the authentication information.

So far, the preferred embodiments are described. However, the invention is not limited to those specifically described embodiments. Variations and modifications may be made without departing from the scope of the present invention, and the embodiments of the invention may appropriately be defined in a variety of applications.

The present invention is not limited to the specifically disclosed embodiments, and variations and modifications may be made without departing from the scope of the present invention.

The present application is based on and claims the benefit of priority of Japanese Priority Application No. 2015-127331 filed on Jun. 25, 2015, the entire contents of which are hereby incorporated herein by reference.

What is claimed is:

1. An authentication system comprising:
a terminal apparatus including,
one or more sensors, the one or more sensors including at least one of a gravity sensor, a gyroscope, an angular sensor, and a proximity sensor,
a reference information storage device configured to store reference information including desired ranges of one or more values corresponding to the one or more sensors in relation to a two-dimensional (2D) code reader, and
the terminal apparatus is configured to,
determine whether a value of at least one of the gravity sensor, the gyroscope, and the angular sensor, and a value of the proximity sensor fall within the desired ranges determined in the reference information, and
display a 2D code based on results of the determination on a display screen; and
an information processing apparatus configured to acquire authentication information from the terminal apparatus, the information processing apparatus including,
the two-dimensional (2D) code reader configured to read the 2D code, and
at least one first processor configured to execute first computer readable instructions to acquire the authentication information from the terminal apparatus by,
reading the 2D code including authentication information displayed on the display screen of the terminal apparatus using the 2D code reader,
extracting the authentication information from the 2D code, and
determine whether a user of the terminal apparatus is authenticated based on the extracted authentication information from the 2D code.

2. The authentication system as claimed in claim 1, wherein
the one or more sensors includes at least an acceleration sensor and the proximity sensor.

3. The authentication system as claimed in claim 1, wherein the terminal apparatus includes at least one second processor configured to execute computer readable instructions to:
receive an instruction for displaying the 2D code; and
display a display component indicating a position at which the 2D code is to be displayed.

4. The authentication system as claimed in claim 1, wherein the at least one first processor is further configured to:
perform an authentication process based on the authentication information extracted from the 2D code; and
transmit an authentication result to the terminal apparatus.

5. The authentication system as claimed in claim 1, further comprising:
an authentication server connected to the information processing apparatus; and
wherein the at least one first processor is further configured to,
transmit the authentication information to the authentication server, and
receive an authentication result transmitted by the authentication server.

6. The authentication system as claimed in claim 1, wherein the 2D code reader is connected to the information processing apparatus via a wired interface; and the at least one first processor is further configured to display on a display operations apparatus included in the information processing apparatus a report indicating that reading of the 2D code has failed when the at least one first processor fails to acquire, via the 2D code reader, image data of the image of the display screen displaying the code.

7. The authentication system as claimed in claim 6, wherein the report includes content indicating that the 2D code is not displayed on the display screen of the terminal apparatus.

8. The authentication system as claimed in claim 6, wherein the at least one first processor is further configured to:
display on the display operations apparatus the report indicating that the reading of the 2D code has failed when the at least one first processor fails to read the 2D code from the image data acquired via the reader.

9. The authentication system as claimed in claim 8, wherein the report includes content that encourages a user to check a screen status of the terminal apparatus.

10. A terminal apparatus configured to display a code including authentication information, the terminal apparatus comprising:
one or more sensors including at least one of a gravity sensor, a gyroscope, an angular sensor, and a proximity sensor;
a reference information storage device configured to store reference information including desired ranges of one or more values corresponding to the one or more sensors in relation to a two-dimensional (2D) code reader;
a screen; and
at least one processor configured to execute computer readable instructions to,
determine whether values of the one or more sensors fall within the desired ranges associated with each of the one or more sensors in relation to the 2D code reader, the 2D code reader connected to an image forming apparatus;
display a 2D code including authentication information on the screen when the one or more values of the one or more sensors fall within the desired ranges within a desired time; and
receive a message from the image forming apparatus indicating whether the authentication information has been authenticated by the image forming apparatus.

11. An image forming apparatus comprising:
a main body apparatus including,
a printer or a scanner, and
at least one first processor configured to execute computer readable instructions to,
control the printer or the scanner; and
a display operation apparatus including at least one second processor, the at least one second processor configured to,
display a user interface including instructions to operate the main body apparatus,
display a state of the main body apparatus,
connect to a two-dimensional (2D) code reader,
receive a 2D QR code read by the 2D code reader, the 2D QR code displayed on a screen of a mobile terminal, the mobile terminal configured to display the 2D QR code when one or more sensors of the mobile terminal fall within desired ranges in relation to the 2D code reader associated with each of the one or more sensors, the mobile terminal including at least one of a gravity sensor, a gyroscope, an angular sensor, and a proximity sensor,
authenticate a user based on the 2D code read by the 2D code reader, and
enable at least the main body apparatus to be operable based on results of the authentication.

12. The image forming apparatus as claimed in claim 11, wherein
the at least one second processor is further configured to,
display a list of print jobs based on results of the authentication, and
receive a selection of at least one print job from the list of print jobs; and the at least one first processor is further configured to,
connect to a print server via a network to receive the selected at least one print job, and
execute the selected at least one print job.

13. The authentication system as claimed in claim 1, wherein the terminal apparatus includes,
at least one third processor configured to execute computer readable instructions to,
determine whether the terminal apparatus is approaching the 2D code reader, and
display the 2D code when the terminal apparatus is determined to be approaching the 2D code reader, and
hide the 2D code when the terminal apparatus is determined to not be approaching the 2D code reader.

14. The authentication system as claimed in claim 1, wherein the terminal apparatus is further configured to:
display the 2D code when the one or more values of the one or more sensors indicate that the display screen of the terminal apparatus is facing the 2D code reader.

15. The authentication system as claimed in claim 1, wherein the terminal apparatus is further configured to:
display the 2D code for a desired time limit; and
stop displaying the 2D code on the display screen if the information processing apparatus has not authenticated the authentication information within the desired time limit.

16. The authentication system as claimed in claim 1, wherein the information processing apparatus is a multi-function printer.

17. The authentication system as claimed in claim 1, wherein the at least one first processor is further configured to,
display a list of print jobs available to the user based on results of the authentication;
receive a selection of at least one print job from the list of print jobs; and
execute the selected at least one print job.

18. The terminal apparatus as claimed in claim 10, wherein the at least one processor is further configured to:
determine whether the terminal apparatus is approaching the 2D code reader; and
display the 2D code when the terminal apparatus is determined to be approaching the 2D code reader, and
hide the 2D code when the terminal apparatus is determined to not be approaching the 2D code reader.

19. The terminal apparatus as claimed in claim 10, wherein the at least one processor is further configured to:

display the 2D code when the one or more values of the one or more sensors indicate that the screen of the terminal apparatus is facing the 2D code reader.

20. The terminal apparatus as claimed in claim 10, wherein the at least one processor is further configured to:
stop displaying the 2D code on the screen if the image forming apparatus has not authenticated the authentication information within the desired time.

* * * * *